(12) United States Patent
Gleason

(10) Patent No.: US 12,043,549 B2
(45) Date of Patent: *Jul. 23, 2024

(54) LEACHING ASSEMBLIES, SYSTEMS, AND METHODS FOR PROCESSING SUPERABRASIVE ELEMENTS

(71) Applicant: US Synthetic Corporation, Orem, UT (US)

(72) Inventor: Michael James Gleason, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/849,373

(22) Filed: Jun. 24, 2022

(65) Prior Publication Data

US 2022/0324714 A1 Oct. 13, 2022

Related U.S. Application Data

(63) Continuation of application No. 16/240,591, filed on Jan. 4, 2019, now Pat. No. 11,370,664, which is a continuation of application No. 15/694,503, filed on Sep. 1, 2017, now Pat. No. 10,183,867, which is a continuation of application No. 15/369,348, filed on Dec. 5, 2016, now Pat. No. 9,783,425, which is a continuation of application No. 13/920,645, filed on Jun. 18, 2013, now Pat. No. 9,550,276.

(51) Int. Cl.
*C01B 32/28* (2017.01)
*B24D 18/00* (2006.01)
*E21B 10/567* (2006.01)

(52) U.S. Cl.
CPC .............. *C01B 32/28* (2017.08); *B24D 18/00* (2013.01); *E21B 10/567* (2013.01)

(58) Field of Classification Search
CPC ........ C01B 32/28; E21B 10/40; E21B 10/567
See application file for complete search history.

(56) References Cited

U.S. PATENT DOCUMENTS

| 3,136,615 A | 6/1964 | Bovenkerk et al. |
| 3,141,746 A | 7/1964 | De Lai et al. |

(Continued)

FOREIGN PATENT DOCUMENTS

| EP | 0196777 | 10/1986 |
| EP | 0300699 | 1/1989 |

(Continued)

OTHER PUBLICATIONS

Nakamura, T. et al.; Study on th eHeat Deterioration Mechanism of Sintered Diamond; Program and Abstracts of the 27th High Pressure Conference of Japan; Oct. 13-15, 1986; Sapporo.

(Continued)

*Primary Examiner* — Pegah Parvini
(74) *Attorney, Agent, or Firm* — BKRIP LLC

(57) ABSTRACT

Leaching assemblies for processing superabrasive elements element and methods of processing superabrasive elements include a protective leaching cup and a liner for receiving at least a portion of a superabrasive element. The liner may include a rear wall, a side wall, and a tapered interface extending between the side wall and the rear wall.

20 Claims, 12 Drawing Sheets

(56) References Cited

U.S. PATENT DOCUMENTS

| | | |
|---|---|---|
| 3,233,988 A | 2/1966 | Wentorf et al. |
| 3,745,623 A | 7/1973 | Wentorf, Jr. et al. |
| 4,108,614 A | 8/1978 | Mitchell |
| 4,151,686 A | 5/1979 | Lee et al. |
| 4,224,380 A | 9/1980 | Bovenkerk et al. |
| 4,255,165 A | 3/1981 | Dennis et al. |
| 4,268,276 A | 5/1981 | Bovenkerk |
| 4,288,248 A | 9/1981 | Bovenkerk et al. |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,410,054 A | 10/1983 | Nagel et al. |
| 4,412,980 A | 11/1983 | Tsuji et al. |
| 4,468,138 A | 8/1984 | Nagel |
| 4,481,016 A | 11/1984 | Campbell et al. |
| 4,486,286 A | 12/1984 | Lewin et al. |
| 4,504,519 A | 3/1985 | Zelez |
| 4,522,633 A | 6/1985 | Dyer |
| 4,525,179 A | 6/1985 | Gigl |
| 4,534,773 A | 8/1985 | Phaal et al. |
| 4,556,403 A | 12/1985 | Almond et al. |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall et al. |
| 4,605,343 A | 8/1986 | Hibbs, Jr. et al. |
| 4,606,738 A | 8/1986 | Hayden |
| 4,621,031 A | 11/1986 | Scruggs |
| 4,636,253 A | 1/1987 | Nakai et al. |
| 4,645,977 A | 2/1987 | Kurokawa et al. |
| 4,662,348 A | 5/1987 | Hall et al. |
| 4,664,705 A | 5/1987 | Horton et al. |
| 4,670,025 A | 6/1987 | Pipkin |
| 4,707,384 A | 11/1987 | Schachner et al. |
| 4,726,718 A | 2/1988 | Meskin et al. |
| 4,731,296 A | 3/1988 | Kikuchi et al. |
| 4,738,322 A | 4/1988 | Hall et al. |
| 4,766,040 A | 8/1988 | Hillert et al. |
| 4,776,861 A | 10/1988 | Frushour |
| 4,784,023 A | 11/1988 | Dennis |
| 4,792,001 A | 12/1988 | Zijsling |
| 4,793,828 A | 12/1988 | Burnand |
| 4,797,241 A | 1/1989 | Peterson et al. |
| 4,802,539 A | 2/1989 | Hall et al. |
| 4,807,402 A | 2/1989 | Rai |
| 4,811,801 A | 3/1989 | Salesky et al. |
| 4,828,582 A | 5/1989 | Frushour |
| 4,844,185 A | 7/1989 | Newton, Jr. et al. |
| 4,854,405 A | 8/1989 | Stroud |
| 4,861,350 A | 8/1989 | Phaal et al. |
| 4,871,377 A | 10/1989 | Frushour |
| 4,899,922 A | 2/1990 | Slutz et al. |
| 4,919,220 A | 2/1990 | Fuller et al. |
| 4,913,247 A | 4/1990 | Jones |
| 4,940,180 A | 7/1990 | Martell |
| 4,943,488 A | 7/1990 | Sung et al. |
| 4,944,772 A | 7/1990 | Cho |
| 4,976,324 A | 12/1990 | Tibbitts |
| 5,011,514 A | 4/1991 | Cho et al. |
| 5,016,718 A | 5/1991 | Tandberg |
| 5,027,912 A | 7/1991 | Juergens |
| 5,030,276 A | 7/1991 | Sung et al. |
| 5,092,687 A | 3/1992 | Hall |
| 5,096,465 A | 3/1992 | Chen et al. |
| 5,116,568 A | 5/1992 | Sung et al. |
| 5,120,327 A | 6/1992 | Dennis |
| 5,127,923 A | 7/1992 | Bunting et al. |
| 5,135,061 A | 8/1992 | Newton, Jr. |
| 5,154,245 A | 10/1992 | Waldenstrom et al. |
| 5,176,720 A | 1/1993 | Martell et al. |
| 5,186,725 A | 2/1993 | Martell et al. |
| 5,199,832 A | 4/1993 | Meskin et al. |
| 5,205,684 A | 4/1993 | Meskin et al. |
| 5,213,248 A | 5/1993 | Horton et al. |
| 5,238,074 A | 8/1993 | Tibbitts et al. |
| 5,264,283 A | 11/1993 | Waldenstrom et al. |
| 5,337,844 A | 8/1994 | Tibbitts |
| 5,355,969 A | 10/1994 | Hardy et al. |
| 5,364,192 A | 11/1994 | Damm et al. |
| 5,368,398 A | 11/1994 | Damm et al. |
| 5,370,195 A | 12/1994 | Keshavan et al. |
| 5,379,853 A | 1/1995 | Lockwood et al. |
| 5,439,492 A | 8/1995 | Anthony et al. |
| 5,447,208 A | 9/1995 | Lund et al. |
| 5,460,233 A | 10/1995 | Meany et al. |
| 5,464,068 A | 11/1995 | Najafi-Sani |
| 5,480,233 A | 1/1996 | Cunningham |
| 5,496,638 A | 3/1996 | Waldenstrom et al. |
| 5,496,639 A | 3/1996 | Connell et al. |
| 5,505,748 A | 4/1996 | Tank et al. |
| 5,510,193 A | 4/1996 | Cerutti et al. |
| 5,523,121 A | 6/1996 | Anthony et al. |
| 5,524,719 A | 6/1996 | Dennis |
| 5,544,713 A | 8/1996 | Dennis |
| 5,560,716 A | 10/1996 | Tank et al. |
| 5,607,024 A | 3/1997 | Keith et al. |
| 5,620,302 A | 4/1997 | Garrison et al. |
| 5,620,382 A | 4/1997 | Cho et al. |
| 5,624,068 A | 4/1997 | Waldenstrom et al. |
| 5,645,617 A | 7/1997 | Frushor |
| 5,653,300 A | 8/1997 | Lund et al. |
| 5,667,028 A | 9/1997 | Traux et al. |
| 5,718,948 A | 2/1998 | Ederyd et al. |
| 5,722,497 A | 3/1998 | Gum et al. |
| 5,722,499 A | 3/1998 | Nguyen et al. |
| 5,759,216 A | 6/1998 | Kanada et al. |
| 5,776,615 A | 7/1998 | Wong et al. |
| 5,833,021 A | 11/1998 | Mensa-Wilmot et al. |
| 5,875,862 A | 3/1999 | Jurewicz et al. |
| 5,897,942 A | 4/1999 | Karner et al. |
| 5,944,129 A | 8/1999 | Jensen |
| 5,954,147 A | 9/1999 | Overstreet et al. |
| 5,967,250 A | 10/1999 | Lund et al. |
| 5,979,578 A | 11/1999 | Packer |
| 6,009,963 A | 1/2000 | Chaves et al. |
| 6,063,333 A | 5/2000 | Dennis |
| 6,123,612 A | 9/2000 | Goers |
| 6,126,741 A | 10/2000 | Jones et al. |
| 6,145,608 A | 11/2000 | Lund et al. |
| 6,193,001 B1 | 2/2001 | Eyre et al. |
| 6,234,261 B1 | 5/2001 | Evans et al. |
| 6,248,447 B1 | 6/2001 | Griffin et al. |
| 6,269,894 B1 | 8/2001 | Griffin |
| 6,290,726 B1 | 9/2001 | Pope et al. |
| 6,315,065 B1 | 11/2001 | Yong et al. |
| 6,332,503 B1 | 12/2001 | Pessier et al. |
| 6,344,149 B1 | 2/2002 | Oles |
| 6,367,568 B2 | 4/2002 | Steinke et al. |
| 6,410,085 B1 | 6/2002 | Griffin et al. |
| 6,435,058 B1 | 8/2002 | Matthias et al. |
| 6,481,511 B2 | 11/2002 | Matthias et al. |
| 6,528,159 B1 | 3/2003 | Kanada et al. |
| 6,544,308 B2 | 4/2003 | Griffin et al. |
| 6,550,556 B2 | 4/2003 | Middlemiss et al. |
| 6,562,462 B2 | 5/2003 | Griffin et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,662 B2 | 8/2003 | Matthias et al. |
| 6,739,214 B2 | 5/2004 | Griffin et al. |
| 6,749,033 B2 | 6/2004 | Griffin et al. |
| 6,793,681 B1 | 9/2004 | Pope et al. |
| 6,797,326 B2 | 9/2004 | Griffin et al. |
| 6,861,098 B2 | 3/2005 | Griffin et al. |
| 6,878,447 B2 | 4/2005 | Griffin et al. |
| 6,892,836 B2 | 5/2005 | Eyre et al. |
| 6,904,984 B1 | 6/2005 | Estes et al. |
| 6,935,444 B2 | 8/2005 | Lund et al. |
| 6,962,214 B2 | 11/2005 | Hughes et al. |
| 6,991,049 B2 | 1/2006 | Eyre et al. |
| 7,350,601 B2 | 4/2008 | Belnap et al. |
| 7,377,341 B2 | 5/2008 | Middlemiss et al. |
| 7,506,698 B2 | 3/2009 | Eyre et al. |

(56) References Cited

U.S. PATENT DOCUMENTS

| | | | |
|---|---|---|---|
| 7,517,589 | B2 | 4/2009 | Eyre |
| 7,568,534 | B2 | 8/2009 | Griffin et al. |
| 7,608,333 | B2 | 10/2009 | Eyre |
| 7,754,333 | B2 | 7/2010 | Eyre et al. |
| 8,147,572 | B2 | 4/2012 | Eyre et al. |
| 8,951,317 | B1 | 2/2015 | Mukhopadhyay et al. |
| 2005/0115744 | A1 | 6/2005 | Griffin et al. |
| 2005/0129950 | A1 | 6/2005 | Griffin et al. |
| 2005/0139397 | A1 | 6/2005 | Achilles et al. |
| 2005/0230156 | A1 | 10/2005 | Belnap et al. |
| 2005/0263328 | A1 | 12/2005 | Middlemiss |
| 2006/0060390 | A1 | 3/2006 | Eyre |
| 2006/0060391 | A1 | 3/2006 | Eyre et al. |
| 2006/0086540 | A1 | 4/2006 | Griffin et al. |
| 2006/0162969 | A1 | 7/2006 | Belnap et al. |
| 2007/0039762 | A1 | 2/2007 | Achilles |
| 2007/0181348 | A1 | 8/2007 | Lancaster et al. |
| 2007/0187155 | A1 | 8/2007 | Middlemiss |
| 2008/0185189 | A1 | 8/2008 | Griffo et al. |
| 2009/0152016 | A1 | 6/2009 | Eyre et al. |
| 2011/0056141 | A1* | 3/2011 | Miess ............ B24D 18/0009 51/307 |
| 2012/0152064 | A1 | 6/2012 | Ladi et al. |
| 2013/0098972 | A1* | 4/2013 | Trinh ............ B23K 20/10 228/110.1 |

FOREIGN PATENT DOCUMENTS

| | | |
|---|---|---|
| EP | 0329954 | 8/1989 |
| EP | 0500253 | 8/1992 |
| EP | 0585631 | 3/1994 |
| EP | 0595630 | 5/1994 |
| EP | 0612868 | 8/1994 |
| EP | 0617207 | 9/1994 |
| EP | 0787820 | 8/1997 |
| EP | 0860515 | 8/1998 |
| EP | 1190791 | 3/2002 |
| GB | 1349385 | 4/1974 |
| GB | 2048927 | 12/1980 |
| GB | 2268768 | 1/1994 |
| GB | 2323398 | 9/1998 |
| GB | 2418215 | 3/2006 |
| GB | 2422394 | 7/2006 |
| JP | 59-35066 | 2/1984 |
| JP | 61-67740 | 10/1984 |
| JP | 59-219500 | 12/1984 |
| JP | 07-62468 | 3/1985 |
| JP | 61-125739 | 6/1986 |
| JP | 63-069971 | 9/1986 |
| JP | 63-55161 | 3/1988 |
| JP | 07-156003 | 11/1993 |
| JP | 11-245103 | 9/1999 |
| JP | 2000-087112 | 3/2000 |
| RU | 2034937 | 5/1995 |
| RU | 566439 | 7/2000 |
| WO | 93/23204 | 11/1993 |
| WO | 96/34131 | 10/1996 |
| WO | 00/28106 | 5/2000 |
| WO | 2004/040095 | 5/2004 |
| WO | 2004/106003 | 12/2004 |
| WO | 2004/106004 | 12/2004 |

OTHER PUBLICATIONS

Hong, S. et al.; "Dissolution Behavior of Fine Particles of Diamond Under High Pressure Sintering Conditions;" Journal of Material Science Letters 10; pp. 164-166; 1991.

* cited by examiner

LEACHING ASSEMBLIES, SYSTEMS, AND METHODS FOR PROCESSING SUPERABRASIVE ELEMENTS

CROSS-REFERENCE TO RELATED MATTERS

This application is a continuation of U.S. patent application Ser. No. 16/240,591 titled "Leaching Assemblies, Systems, and Methods for Processing Superabrasive Elements" and filed 4 Jan. 2019, which is a continuation of U.S. patent application Ser. No. 15/694,503 titled "Leaching Assemblies, Systems, and Methods for Processing Superabrasive Elements" and filed 1 Sep. 2017, which is a continuation of U.S. patent application Ser. No. 15/369,348 titled "Leaching Assemblies, Systems, and Methods for Processing Superabrasive Elements" and filed 5 Dec. 2016, which is a continuation of U.S. patent application Ser. No. 13/920,645 titled "Leaching Assemblies, Systems, and Methods for Processing Superabrasive Elements" and filed 18 Jun. 2013, the disclosure of each of which is hereby incorporated by reference in its entirety.

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems. Conventional superabrasive materials have found utility as superabrasive cutting elements in rotary drill bits, such as roller cone drill bits and fixed-cutter drill bits. A conventional cutting element may include a superabrasive layer or table, such as a PCD table. The cutting element may be brazed, press-fit, or otherwise secured into a preformed pocket, socket, or other receptacle formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

As mentioned above, conventional superabrasive materials have found utility as bearing elements, which may include bearing elements utilized in thrust bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, or through other suitable methods of attachment. Typically, bearing elements mounted to a bearing rotor have superabrasive faces configured to contact corresponding superabrasive faces of bearing elements mounted to an adjacent bearing stator.

Cutting elements having a PCD table may be formed and bonded to a substrate using an ultra-high pressure, ultra-high temperature ("HPHT") sintering process. Often, cutting elements having a PCD table are fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into a HPHT press. The substrates and diamond particle volumes may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, and/or iron, that facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond crystals. A metal-solvent catalyst may also be mixed with a volume of diamond particles prior to subjecting the diamond particles and substrate to the HPHT process.

The metal-solvent catalyst may dissolve carbon from the diamond particles and portions of the diamond particles that graphitize due to the high temperatures used in the HPHT process. The solubility of the stable diamond phase in the metal-solvent catalyst may be lower than that of the metastable graphite phase under HPHT conditions. As a result of the solubility difference, the graphite tends to dissolve into the metal-solvent catalyst and the diamond tends to deposit onto existing diamond particles to form diamond-to-diamond bonds. Accordingly, diamond grains may become mutually bonded to form a matrix of polycrystalline diamond, with interstitial regions defined between the bonded diamond grains being occupied by the metal-solvent catalyst. In addition to dissolving carbon and graphite, the metal-solvent catalyst may also carry tungsten, tungsten carbide, and/or other materials from the substrate into the PCD layer of the cutting element.

The presence of the metal-solvent catalyst and/or other materials in the diamond table may reduce the thermal stability of the diamond table at elevated temperatures. For example, the difference in thermal expansion coefficient between the diamond grains and the solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. Further, portions of diamond grains may transform to carbon monoxide, carbon dioxide, graphite, or combinations thereof, thereby degrading the mechanical properties of the PCD material.

Accordingly, it is desirable to remove a metal-solvent catalyst from a PCD material in situations where the PCD material may be exposed to high temperatures. Chemical leaching is often used to dissolve and remove various materials from the PCD layer. For example, chemical leaching may be used to remove metal-solvent catalysts, such as cobalt, from regions of a PCD layer that may experience elevated temperatures during drilling, such as regions adjacent to the working surfaces of the PCD layer.

Conventional chemical leaching techniques often involve the use of highly concentrated and corrosive solutions, such as highly acidic solutions, to dissolve and remove metal-solvent catalysts from polycrystalline diamond materials. However, in addition to dissolving metal-solvent catalysts from a PCD material, leaching solutions may also dissolve any accessible portions of a substrate to which the PCD material is attached. For example, highly acidic leaching solutions may dissolve any accessible portions of a cobalt-cemented tungsten carbide substrate, causing undesired pitting and/or other corrosion of the substrate surface.

In some conventional leaching techniques, a polymeric leaching cup may be placed around a portion of a PCD element or other PCD article to protect the substrate from a leaching solution. A polymeric leaching cup may, for example, surround the substrate surface and a portion of the PCD layer near the substrate. Such leaching cups may, however, provide inadequate protection during leaching. For example, during loading of a PCD article into a leaching cup, a portion of the leaching cup may be torn or otherwise damaged by an edge or chamfer portion of the PCD article. A leaching cup damaged in such a manner may undesirably allow a leaching solution to enter between the leaching cup and the PCD article such that a portion of the substrate of the PCD article is exposed to the leaching solution. Additionally, pinholes may be formed in a leaching cup during ejection of the PCD article from a leaching apparatus following a leaching procedure. Such holes formed in the leaching cup may allow leaching solution to enter the leaching cup and come into contact with a substrate portion of the PCD article. Exposure to a leaching solution may result in undesired corrosion and/or damage to PCD substrates.

SUMMARY

The instant disclosure is directed to exemplary leaching assembly systems, leaching assemblies, and methods for processing a polycrystalline diamond element. According to at least one embodiment, a leaching assembly system for processing a polycrystalline diamond element may comprise a protective leaching cup configured to surround at least a portion of a polycrystalline diamond element and a liner configured to be positioned between the polycrystalline diamond element and the protective leaching cup.

The liner may comprise a side wall, a rear wall opposite an opening defined in the liner, and a rounded edge portion at the intersection of the side wall and the rear wall. The liner may be configured to surround at least a portion of the polycrystalline diamond element such that the side wall of the liner is adjacent a side surface of the polycrystalline diamond element, the rear wall of the liner is adjacent a rear surface of the polycrystalline diamond element, and a gap is defined between the rounded edge portion of the liner and the polycrystalline diamond element. The liner may also be configured to contact at least one of the side portion of the polycrystalline diamond element and the rear portion of the polycrystalline diamond element. According to various embodiments, the liner may comprise a substantially rigid material, such as at least one of a metallic material and a polymeric material.

In at least one embodiment, the protective leaching cup may comprise a side wall having a length that exceeds a length of the side wall of the liner. The protective leaching cup may comprise a seal region configured to contact a portion of the cutting element and an encapsulating region configured to surround the liner. the seal region of the protective leaching cup may have a smaller diameter than the encapsulating region of the protective leaching cup.

In various embodiments, a polycrystalline diamond element leaching assembly may comprise a polycrystalline diamond element, a protective leaching cup surrounding at least a portion of the polycrystalline diamond element, and a liner positioned between the polycrystalline diamond element and the protective leaching cup. In some embodiments, the liner may comprise a side wall, a rear wall opposite an opening defined in the liner, and a rounded edge portion at the intersection of the side wall and the rear wall.

Additionally, the polycrystalline diamond element may comprise a cutting face, a rear surface opposite the cutting face, and a side surface extending between the cutting face and the rear surface. The liner may surround at least a portion of the polycrystalline diamond element such that the side wall of the liner may be adjacent a portion of the side surface of the polycrystalline diamond element, the rear wall of the liner may be adjacent a portion of the rear surface of the polycrystalline diamond element, and a gap may be defined between the rounded edge portion of the liner and the polycrystalline diamond element.

In at least one embodiment, the polycrystalline diamond element may comprise a chamfer at the intersection of the side surface and the rear surface. A gap may be defined between the rounded edge portion of the liner and the chamfer of the polycrystalline diamond element. The liner may contact at least one of the side surface of the polycrystalline diamond element and the rear surface of the polycrystalline diamond element. According to some embodiments, the polycrystalline diamond element may comprise a substrate and a polycrystalline diamond table bonded to the substrate. The protective leaching cup may also comprise a seal region contacting a portion of the polycrystalline diamond table of the polycrystalline diamond element and an encapsulating region surrounding the liner and the substrate of the polycrystalline diamond element. The liner may surround at least a portion of the substrate of the polycrystalline diamond element. Additionally, liner may be positioned adjacent a portion of the polycrystalline diamond table of the polycrystalline diamond element.

According to various embodiments, a method of processing a polycrystalline diamond element may comprise providing a polycrystalline diamond element, assembling the polycrystalline diamond element, a liner, and a protective leaching cup such that the liner is disposed between the polycrystalline diamond element and the protective leaching cup, and exposing at least a portion of the polycrystalline diamond element to a leaching agent. Positioning the liner and the polycrystalline diamond element in the protective leaching cup may comprise positioning a seal region of the protective leaching cup in contact with a portion of a side surface of the polycrystalline diamond element.

Features from any of the disclosed embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
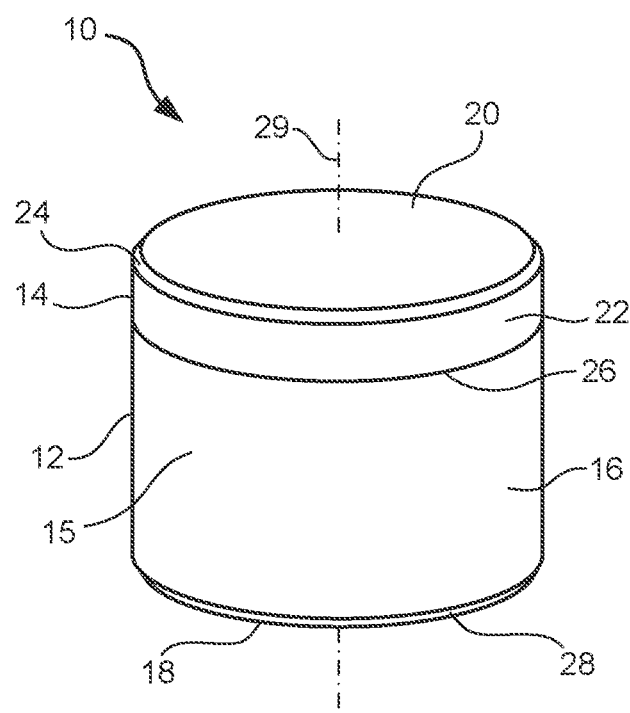
FIG. 1 is a perspective view of an exemplary superabrasive element including a substrate and a superabrasive table according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary assemblies, systems, and methods for processing polycrystalline diamond elements. Such polycrystalline diamond elements may be used as cutting elements for use in a variety of applications, such as drilling tools, machining equipment, cutting tools, and other apparatuses, without limitation. Polycrystalline diamond elements, as disclosed herein, may also be used as bearing elements in a variety of bearing applications, such as thrust bearings, radial bearings, and other bearing apparatuses, without limitation.

The terms "superabrasive" and "superhard," as used herein, may refer to any material having a hardness that is at least equal to a hardness of tungsten carbide. For example, a superabrasive article may represent an article of manufacture, at least a portion of which may exhibit a hardness that is equal to or greater than the hardness of tungsten carbide. The term "cutting," as used herein, may refer to machining processes, drilling processes, boring processes, and/or any other material removal process utilizing a cutting element and/or other cutting apparatus, without limitation.

Figure 2:
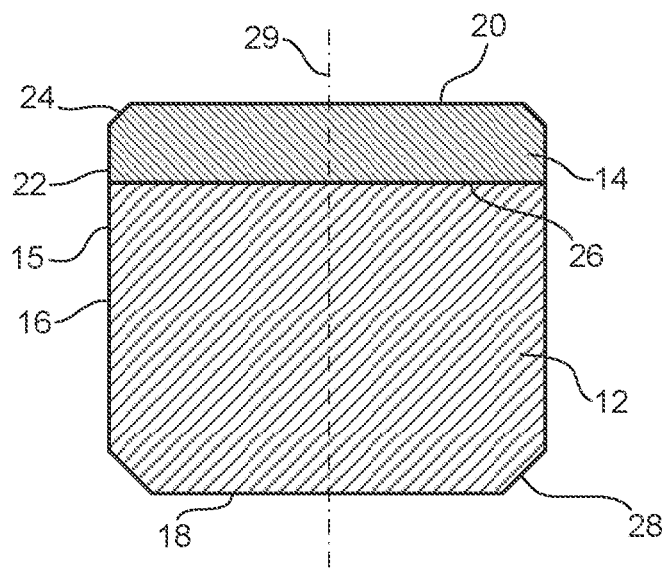
FIG. 2 is a cross-sectional side view of the exemplary superabrasive element illustrated in FIG. 1.

FIGS. 1 and 2 illustrate an exemplary superabrasive element 10 according to at least one embodiment. As illustrated in FIGS. 1 and 2, superabrasive element 10 may comprise a superabrasive table 14 affixed to or formed upon a substrate 12. Superabrasive table 14 may be affixed to substrate 12 at interface 26. Superabrasive element 10 may comprise a rear surface 18, a superabrasive face 20, and an element side surface 15. In some embodiments, element side surface 15 may include a substrate side surface 16 formed by substrate 12 and a superabrasive side surface 22 formed by superabrasive table 14. Rear surface 18 may be formed by substrate 12.

Superabrasive element 10 may also comprise a superabrasive face 20 and a superabrasive chamfer 24 (i.e., sloped or angled) formed by superabrasive table 14. Superabrasive chamfer 24 may comprise an angular and/or rounded edge formed at the intersection of superabrasive side surface 22 and superabrasive face 20. Any other suitable surface shape may also be formed at the intersection of superabrasive side surface 22 and superabrasive face 20, including, without limitation, an arcuate surface (e.g., a radius, an ovoid shape, or any other rounded shape), a sharp edge, multiple chamfers/radii, a honed edge, and/or combinations of the foregoing. At least one edge may be formed at the intersection of superabrasive chamfer 24 and superabrasive face 20 and/or at the intersection of superabrasive chamfer 24 and superabrasive side surface 22.

In some embodiments, superabrasive element 10 may be utilized as a cutting element for a drill bit, in which superabrasive chamfer 24 acts as a cutting edge. The phrase "cutting edge" may refer, without limitation, to a portion of a cutting element that is configured to be exposed to and/or in contact with a subterranean formation during drilling. In at least one embodiment, superabrasive element 10 may be utilized as a bearing element (e.g., with superabrasive face 20 acting as bearing surface) configured to contact oppositely facing bearing elements.

According to various embodiments, superabrasive element 10 may also comprise a substrate chamfer 28 formed by substrate 12. Substrate chamfer 28 may comprise an angular and/or rounded edge formed at the intersection of substrate side surface 16 and rear surface 18. Any other suitable surface shape may also be formed at the intersection of substrate side surface 16 and rear surface 18, including, without limitation, an arcuate surface (e.g., a radius, an ovoid shape, or any other rounded shape), a sharp edge, multiple chamfers/radii, a honed edge, and/or combinations of the foregoing. At least one edge may also be formed at the intersection of substrate chamfer 28 and rear surface 18 and/or at the intersection of substrate chamfer 28 and substrate side surface 16.

Superabrasive element 10 may comprise any suitable size, shape, and/or geometry, without limitation. According to at least one embodiment, at least a portion of superabrasive element 10 may have a substantially cylindrical shape. For example, superabrasive element 10 may comprise a substantially cylindrical outer surface surrounding a central axis 29 extending through superabrasive element 10, as illustrated in FIGS. 1 and 2. For example, substrate side surface 16 and superabrasive side surface 22 may be substantially cylindrical and may have any suitable diameters relative to central axis 29, without limitation. According to various embodiments, substrate side surface 16 and superabrasive side surface 22 may have substantially the same outer diameter relative to central axis 29.

Substrate 12 may comprise any suitable material on which superabrasive table 14 may be formed. In at least one embodiment, substrate 12 may comprise a cemented carbide material, such as a cobalt-cemented tungsten carbide material and/or any other suitable material. In some embodiments, substrate 12 may include a suitable metal-solvent catalyst material, such as, for example, cobalt, nickel, iron, and/or alloys thereof. Substrate 12 may also include any suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof. Superabrasive table 14 may be formed of any suitable superabrasive and/or superhard material or combination of materials, including, for example PCD. According to additional embodiments, superabrasive table 14 may comprise cubic boron nitride, silicon carbide, polycrystalline diamond, and/or mixtures or composites including one or more of the foregoing materials, without limitation.

Superabrasive table 14 may be formed using any suitable technique. According to some embodiments, superabrasive table 14 may comprise a PCD table fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., $sp^3$-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution.

Following sintering, various materials, such as a metal-solvent catalyst, remaining in interstitial regions within the as-sintered PCD body may reduce the thermal stability of superabrasive table 14 at elevated temperatures. In some examples, differences in thermal expansion coefficients between diamond grains in the as-sintered PCD body and a metal-solvent catalyst in interstitial regions between the diamond grains may weaken portions of superabrasive table 14 that are exposed to elevated temperatures, such as temperatures developed during drilling and/or cutting operations. The weakened portions of superabrasive table 14 may be excessively worn and/or damaged during the drilling and/or cutting operations.

Removing the metal-solvent catalyst and/or other materials from the as-sintered PCD body may improve the heat resistance and/or thermal stability of superabrasive table 14, particularly in situations where the PCD material may be exposed to elevated temperatures. A metal-solvent catalyst and/or other materials may be removed from the as-sintered PCD body using any suitable technique, including, for example, leaching. In at least one embodiment, a metal-solvent catalyst, such as cobalt, may be removed from regions of the as-sintered PCD body, such as regions adjacent to the working surfaces of superabrasive table 14. Removing a metal-solvent catalyst from the as-sintered PCD body may reduce damage to the PCD material of superabrasive table 14 caused by expansion of the metal-solvent catalyst.

At least a portion of a metal-solvent catalyst, such as cobalt, as well as other materials, may be removed from at least a portion of the as-sintered PCD body using any suitable technique, without limitation. For example, chemical and/or gaseous leaching may be used to remove a metal-solvent catalyst from the as-sintered PCD body up to a desired depth from a surface thereof. The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form superabrasive table 14 comprising a PCD table. For example, the as-sintered PCD body may be immersed in the acid for about 2 to about 7 days (e.g., about 3, 5, or 7 days) or for a few weeks (e.g., about 4 weeks) depending on the process employed.

Even after leaching, a residual, detectable amount of the metal-solvent catalyst may be present in the at least partially leached superabrasive table 14. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, only selected portions of the as-sintered PCD body may be leached, leaving remaining portions of resulting superabrasive table 14 unleached. For example, some portions of one or more surfaces of the as-sintered PCD body may be masked or otherwise protected from exposure to a leaching solution and/or gas mixture while other portions of one or more surfaces of the as-sintered PCD body may be exposed to the leaching solution and/or gas mixture. Other suitable techniques may be used for removing a metal-solvent catalyst and/or other materials from the as-sintered PCD body or may be used to accelerate a chemical leaching process. For example, exposing the as-sintered PCD body to heat, pressure, electric current, microwave radiation, and/or ultrasound may be employed to leach or to accelerate a chemical leaching process, without limitation. Following leaching, superabrasive table 14 may comprise a volume of PCD material that is substantially free of a metal-solvent catalyst.

The plurality of diamond particles used to form superabrasive table 14 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 15 µm, 12 µm, 10 µm, 8 µm, 4 µm, 2 µm, 1 µm, 0.5 µm, less than 0.5 µm, 0.1 µm, less than 0.1 µm). In another embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also include three or more different sizes (e.g., one relatively larger size and two or more relatively smaller sizes) without limitation.

Figure 3:
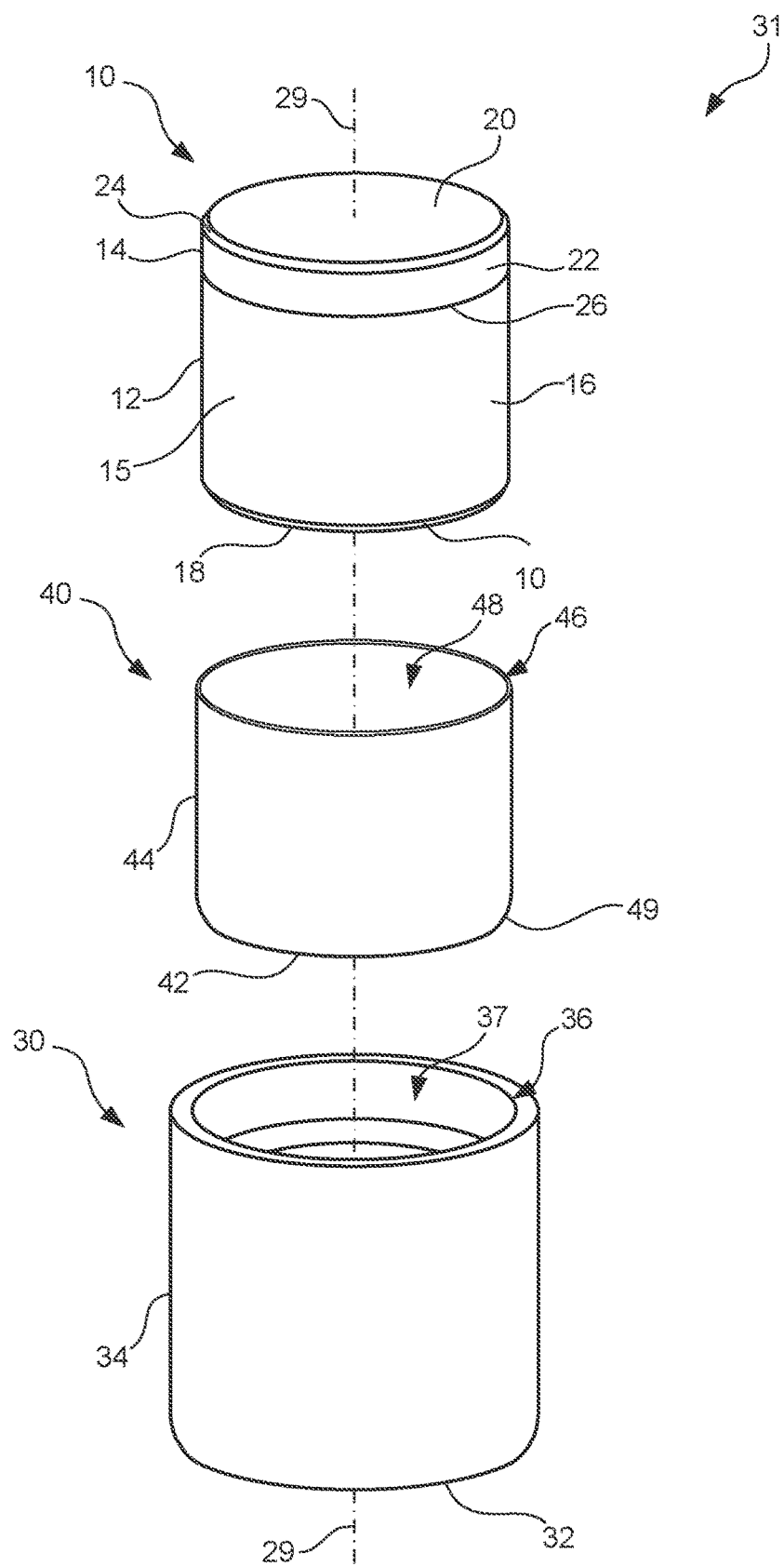
FIG. 3 is a perspective view of an exemplary leaching assembly according to at least one embodiment.
Figure 4:
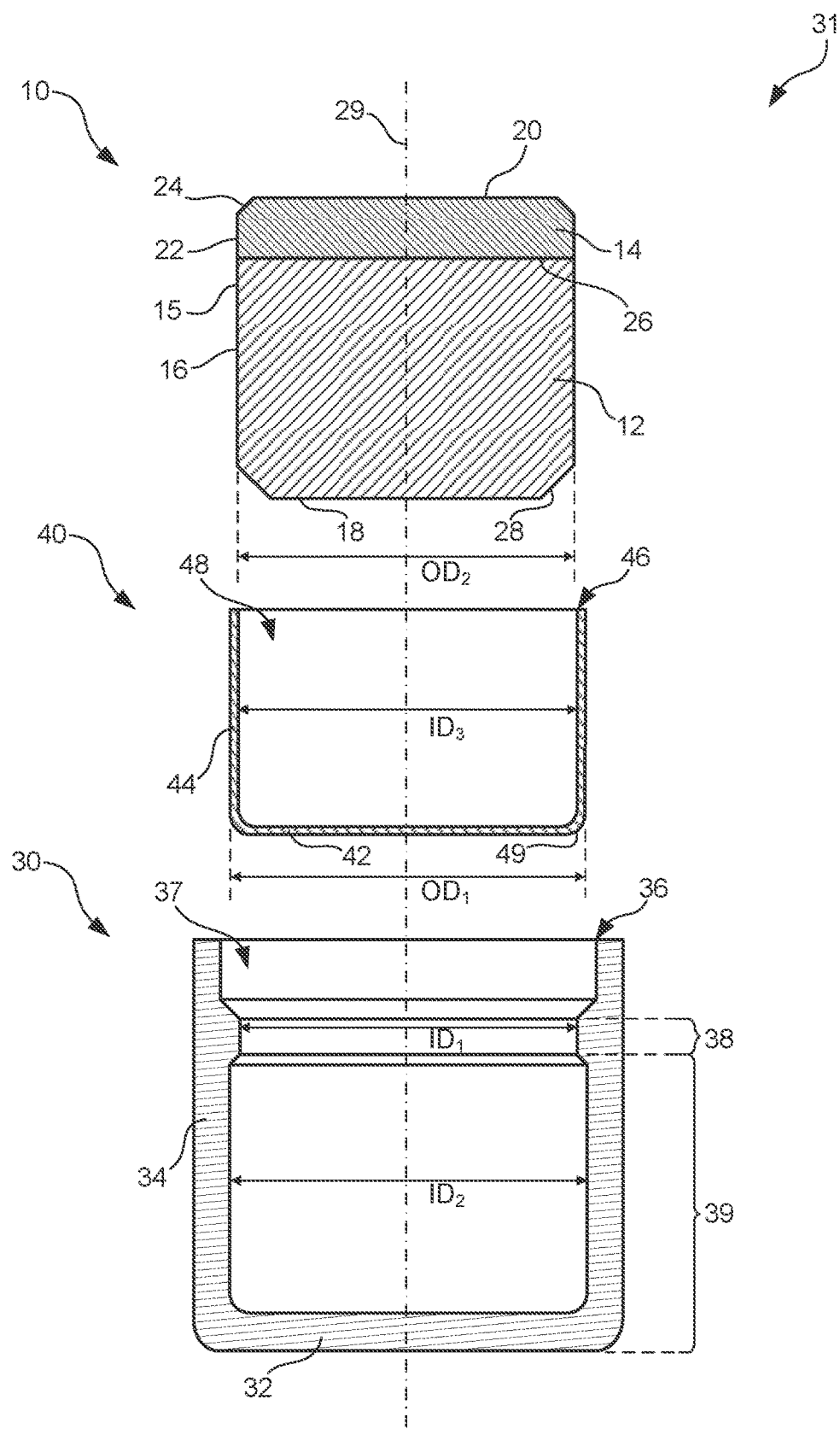
FIG. 4 is a cross-sectional side view of an exemplary leaching assembly according to at least one embodiment.

FIGS. 3 and 4 illustrate an exemplary leaching assembly 31 according to at least one embodiment. As illustrated in FIGS. 3 and 4, leaching assembly 31 may include a protective leaching cup 30 and a liner 40 for processing superabrasive element 10. Protective leaching cup 30 may comprise a rear wall 32 and a side wall 34 defining a cavity 37 extending from opening 36. Protective leaching cup 30 may be formed of any suitable material, without limitation. For example, protective leaching cup 30 may comprise a flexible, elastic, malleable, and/or otherwise deformable material configured to surround and/or contact at least a portion of superabrasive element 10 and liner 40. In some embodiments, protective leaching cup 30 may include one or more polymeric materials, such as, for example, nylon, polytetrafluoroethylene (PTFE), polyethylene, rubber, silicone, and/or other polymers, without limitation. Protective leaching cup 30 may be formed using any suitable technique. For example, protective leaching cup 30 may comprise a polymeric material that is shaped through a molding process (e.g., injection molding, blow molding, compression molding, drawing, etc.).

In at least one embodiment, protective leaching cup 30 may comprise a material that is configured to conform to an exterior portion of superabrasive element 10. For example, protective leaching cup 30 may include a malleable and/or elastic material that conforms to an exterior shape of a portion of superabrasive table 14 abutting protective leaching cup 30, such as superabrasive side surface 22. According to some embodiments, protective leaching cup 30 may comprise a material, such as a polymeric material, that conforms to surface imperfections of superabrasive side surface 22 and/or side surface 16. Heat and/or pressure may be applied to protective leaching cup 30 to cause a portion of protective leaching cup 30 abutting superabrasive side surface 22 to more closely conform to superabrasive side surface 22. Accordingly, a seal between superabrasive side surface 22 and a portion of protective leaching cup 30 abutting superabrasive side surface 22 may be improved, thereby inhibiting passage of a leaching agent between superabrasive element 10 and protective leaching cup 30.

Protective leaching cup 30 may comprise any suitable size, shape and/or geometry, without limitation. In at least one embodiment, portions of protective leaching cup 30 may have a substantially cylindrical outer periphery surrounding central axis 29, as illustrated in FIGS. 3 and 4. Rear wall 32 and side wall 34 may define a cavity 37 within protective leaching cup 30. Cavity 37 may be shaped to surround at least a portion of superabrasive element 10, as described in greater detail below with reference to FIG. 6. Opening 36 may be defined in a portion of protective leaching cup 30 opposite rear wall 32 such that cavity 37 extends between opening 36 and rear wall 32.

As illustrated in FIG. 4, cavity 37 may be defined by an inner surface of side wall 34 and an inner surface of rear wall 32. According to various embodiments, protective leaching cup 30 may comprise a seal region 38 and an encapsulating region 39. Seal region 38 may be adjacent opening 36 and encapsulating region 39 may extend from seal region 38 and may include rear wall 32. According to some embodiments, a portion of side wall 34 in seal region 38 may have a different diameter and/or shape than a portion of side wall 34 in encapsulating region 39. For example, as shown in FIG. 4, a portion of side wall 34 in encapsulating region 39 may have an inner diameter $ID_2$ that is greater than an inner diameter $ID_1$ of a portion of side wall 34 in seal region 38 relative to central axis 29.

As shown in FIGS. 3 and 4, liner 40 may comprise a rear wall 42 and a side wall 44 defining a cavity 48 configured to surround and/or contact at least a portion of superabrasive element 10. Additionally, liner 40 may comprise a rounded edge portion 49 formed at an intersection of rear wall 42 and side wall 44. Rounded edge portion 49 may comprise any suitable surface shape, such as, for example, an arcuate surface (e.g., a radius, an ovoid shape, or any other rounded shape), multiple radii, a honed edge, a combination arcuate and flat surface, or any combination of the foregoing. Rear wall 42, side wall 44, and rounded edge portion 49 may each be formed to any suitable shape and thickness, without limitation.

Liner 40 may be formed of any suitable material. For example, liner 40 may comprise a rigid or substantially rigid material. In some embodiments, liner 40 may comprise one or more metallic materials. For example, liner 40 may be formed of one or more refractory metal materials, such as niobium, tantalum, molybdenum, tungsten, rhenium, chromium, vanadium, hafnium, zirconium, and/or any other suitable metallic material or alloy thereof. In additional embodiments, liner 40 may comprise various other suitable metallic materials and/or alloys thereof, such as, for example, precious metals, platinum group metals (e.g., gold and/or platinum), iron, tin, copper, silver, bronze, aluminum, steel and/or steel alloys, or any alloys of one or more of the foregoing. In additional embodiments, liner 40 may comprise one or more polymeric materials. For example, liner 40 may comprise polytetrafluoroethylene (PTFE) and/or any other suitable polymer or resin, without limitation. Liner 40 may also comprise any other suitable material or combination of materials, including, for example, ceramic, glass, a carbon material, a metallic material, a carbon allotrope material, a composite material, an oxide material, a carbide material, and/or any combination of the foregoing.

Liner 40 may be formed using any suitable technique. For example, liner 40 may comprise a metallic material that is shaped through a molding, drawing, machining, milling, grinding, and/or any other suitable metalworking or forming technique. According to some embodiments, a disk-shaped blank (e.g., a niobium blank) may be subjected to a drawing operation. During such a drawing operation, a punch may be utilized to force the disk-shaped blank into a corresponding forming die cavity. In at least one embodiment, liner 40 may comprise a polymeric material that is shaped using, for example, a molding operation (e.g., injection molding, blow molding, compression molding, drawing, etc.). In various embodiments, a combination of a metallic material, a polymeric material, and/or any other suitable material may also be utilized to form liner 40. For example, liner 40 may comprise a metallic material (e.g., niobium, steel, etc.) having one or more surfaces coated with a polymeric layer (e.g., PTFE) and/or other suitable material. In other embodiments, liner 40 may be formed on superabrasive element 10 as a coating by spraying, dipping, polymerization, electroplating, chemical vapor deposition, physical vapor deposition, and/or any suitable coating technique, without limitation. Such a coating may be formed on superabrasive element 10 so as to have rounded edge portions formed adjacent more angular portions (e.g., chamfer 28) of superabrasive element 10.

Liner 40 may comprise any suitable size, shape, and geometry configured to surround at least a portion of superabrasive element 10. In at least one embodiment, portions of liner 40 may have a substantially cylindrical outer periphery surrounding central axis 29, as illustrated in FIGS. 3 and 4. Rear wall 42 and side wall 44 may define a cavity 48 within liner 40. Cavity 48 may be shaped to surround at least a portion of superabrasive element 10, as described in greater detail below with reference to FIG. 6. An opening 46 may be defined in a portion of liner 40 opposite rear wall 42 such that cavity 48 extends between opening 46 and rear wall 42.

Liner 40 may be sized to fit within encapsulating region 39 of protective leaching cup 30. According to various embodiments, side wall 44 of liner 40 may have an outer diameter $OD_1$ that is approximately the same as or smaller, relative to central axis 29, than inner diameter $ID_2$ of a portion of side wall 34 of protective leaching cup 30 in encapsulating region 39. Additionally, outer diameter $OD_1$ of liner 40 may be greater, relative to central axis 29, than inner diameter $ID_1$ of a portion of side wall 34 of protective leaching cup 30 in seal region 38. As illustrated in FIG. 4, cavity 48 may be defined by an inner surface of side wall 44 and an inner surface of rear wall 42. Cavity 48 of liner 40 may be sized to surround at least a portion of cutting element 10. For example, side wall 44 of liner 40 may have an inner diameter $ID_3$ that is approximately the same as or greater than an outer diameter $OD_2$ of superabrasive element 10 relative to central axis 29.

Figure 5:
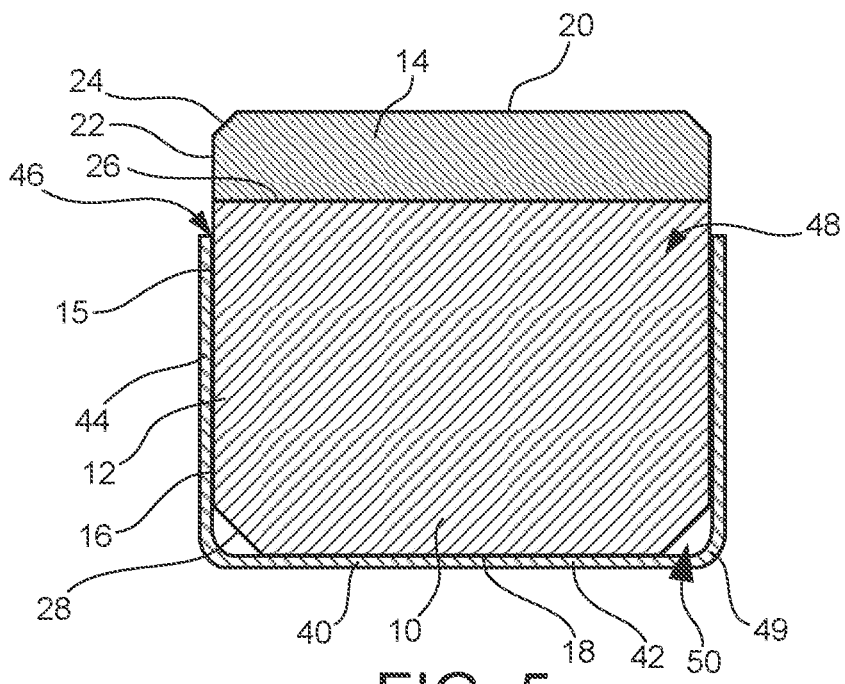
FIG. 5 is a cross-sectional side view of an exemplary superabrasive element positioned within an exemplary liner according to at least one embodiment.

FIG. 5 illustrates a superabrasive element 10 positioned within an exemplary liner 40 according to at least one embodiment. Superabrasive element 10 may be positioned within liner 40 such that at least a portion of an outer periphery of superabrasive element 10 is surrounded by liner 40. For example, superabrasive element 10 may be positioned within liner 40 so that at least a portion of rear surface 18 of superabrasive element 10 is adjacent rear wall 42 of liner 40 and/or so that at least a portion of side surface 15, such as substrate side surface 16, is adjacent side wall 44 of liner 40. In some embodiments, superabrasive element 10 may contact side wall 44 and/or rear wall 42 of liner 40. For example, superabrasive element 10 may be tightly surrounded by liner 40 so as to secure liner 40 to superabrasive element 10. For example, liner 40 may be secured around superabrasive element 10 by press-fitting. In additional embodiments, superabrasive element 10 may be less tightly (e.g., removably) surrounded by liner 40, thereby facilitating insertion and/or removal of superabrasive element 10 from liner 40. According to some embodiments, liner 40 may be bonded or otherwise adhered to at least a portion of side surface 15 and/or rear surface 18 of superabrasive element 10.

As illustrated in FIG. 5, a gap 50 may be defined between rounded edge portion 49 of liner 40 and substrate chamfer 28 of superabrasive element 10. For example, when superabrasive element 10 is disposed within liner 40 such that element side surface 15 and rear surface 18 of superabrasive element 10 are respectively positioned adjacent side wall 44 and rear wall 42 of liner 40, chamfer 28 of superabrasive element 10 may be spaced away from an inner surface of rounded edge portion 49 so as to define gap 50.

Figure 6:
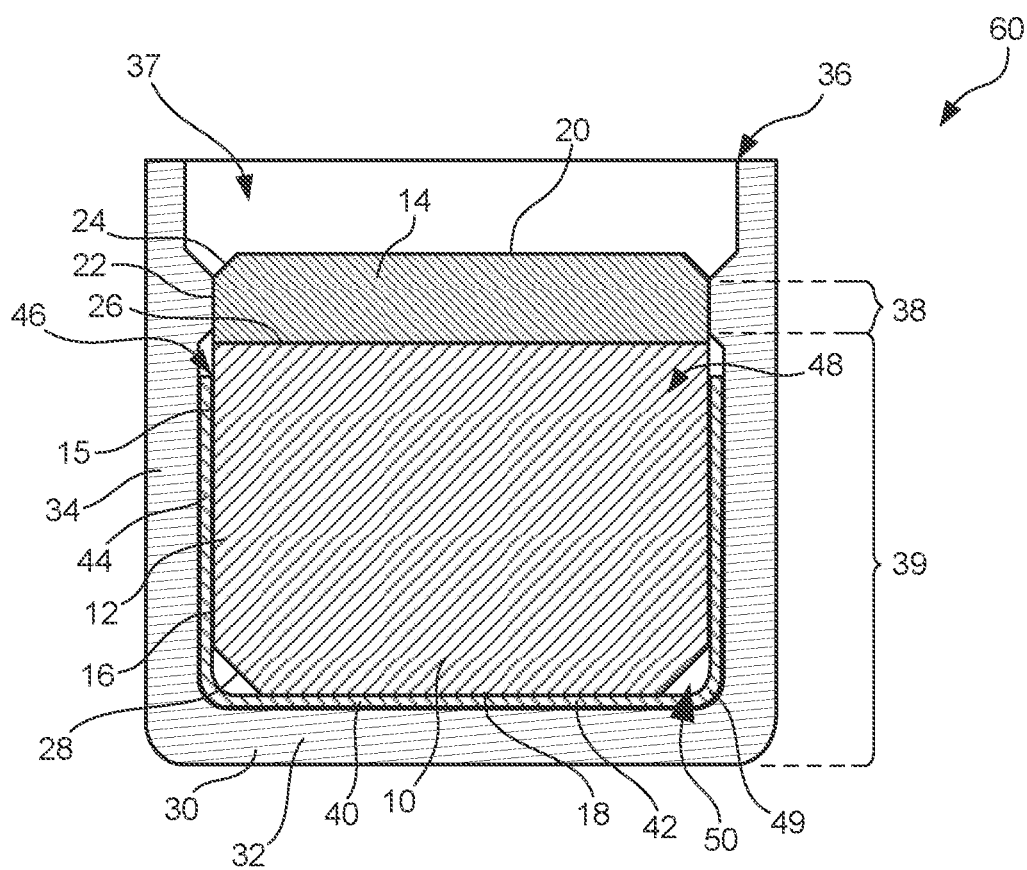
FIG. 6 is a cross-sectional side view of an exemplary superabrasive element leaching assembly according to at least one embodiment.

FIG. 6 illustrates an exemplary leaching assembly 60 comprising superabrasive element 10, protective leaching cup 30, and liner 40 according to at least one embodiment. As shown in FIG. 6, superabrasive element 10 may be positioned within liner 40, and superabrasive element 10 and liner 40 may both be positioned within protective leaching cup 30. Superabrasive element 10 and liner 40 may be positioned within protective leaching cup 30 such that at least a portion of an outer periphery of superabrasive element 10 and at least a portion of an outer periphery of liner 40 are surrounded by protective leaching cup 30.

According to some embodiments, superabrasive element 10 and liner 40 may be positioned within protective leaching cup 30 so that rear wall 42 of liner 40 is adjacent rear wall 32 of protective leaching cup 30 and/or so that at least a portion of side wall 44 of liner 40 is adjacent side wall 34 of protective leaching cup 30. Additionally, at least a portion of superabrasive element 10, such as superabrasive table 14 and/or substrate 12, may be positioned adjacent a portion of protective leaching cup 30. For example, seal region 38 of protective leaching cup 30 may be configured to contact at least a portion of element side surface 15 of superabrasive element 10, forming a seal between protective leaching cup 30 and superabrasive element 10 that is partially or fully impermeable to various fluids, such as a leaching material (e.g., a leaching solution). As shown in FIG. 6, superabrasive element 10 may be positioned within protective leaching cup 30 so that seal region 38 of protective leaching cup 30 contacts and forms a seal with at least a portion of element side surface 15, such as at least a portion of superabrasive side surface 22 and/or at least a portion of substrate side surface 16. In some embodiments, at least a portion of seal region 38 of protective leaching cup 30 may have an inner diameter $ID_1$ that is equal to or less than (e.g., when unassembled with superabrasive element 10) an outer diameter $OD_2$ of superabrasive element 10 (e.g., inner diameter $ID_1$ and outer diameter $OD_2$ illustrated in FIG. 4). Accordingly, at least a portion of side wall 34 in seal region 38 of protective leaching cup 30 may contact and/or form a seal with at least a portion of superabrasive element 10.

According to some embodiments, when assembled, at least a portion of encapsulating region 39 may have an inner diameter $ID_2$ that is greater than an outer diameter $OD_2$ of superabrasive element 10 and greater than or equal to an outer diameter $OD_1$ of liner 40 (e.g., inner diameter $ID_2$, outer diameter $OD_1$, and outer diameter $OD_2$ illustrated in FIG. 4). For example, when superabrasive element 10 and liner 40 are surrounded by protective leaching cup 30, at least a portion of side wall 34 in encapsulating region 39 of protective leaching cup 30 may be spaced apart from superabrasive element 10 such that a space or gap is defined between element side surface 15 of superabrasive element 10 and encapsulating region 39 of protective leaching cup 30. In some embodiments, at least a portion of side wall 34 in encapsulating region 39 of protective leaching cup 30 may be spaced apart from liner 40 such that a space or gap is defined between side wall 44 of liner 40 and encapsulating region 39 of protective leaching cup 30. In additional embodiments, at least a portion of encapsulating region 39 may have an inner diameter $ID_2$ that is approximately the same as or less than an outer diameter $OD_1$ of liner 40 (e.g., inner diameter $ID_2$ and outer diameter $OD_1$ illustrated in FIG. 4). In such embodiments, at least a portion of side wall 34 in encapsulating region 39 may contact liner 40.

According to at least one embodiment, prior to leaching, superabrasive element 10 may be positioned in liner 40. Subsequently, superabrasive element 10 and liner 40 may be loaded into and positioned within protective leaching cup 30 so that at least a portion of side wall 34 in seal region 38 of protective leaching cup 30 is positioned adjacent at least a portion of element side surface 15 of superabrasive element 10, and so that rear surface 18 of superabrasive element 10 is positioned in close proximity to rear wall 32 of protective leaching cup 30. Rounded edge portion 49 of liner 40 may facilitate loading of superabrasive element 10 and liner 40 into protective leaching cup 30. Moreover, rounded edge portion 49 of liner 40 may prevent tearing or otherwise damaging protective leaching cup 30 (e.g., seal region 38) during loading. For example, rounded edge portion 49 of liner 40 may comprise a more rounded and/or gently curving surface in comparison with substrate chamfer 28 of superabrasive element 10, thereby reducing a potential for tearing and/or damaging protective leaching cup 30 (e.g., seal region 38) during loading. Additionally, in some embodiments, rounded edge portion 49 may be formed of a material that presents a lower potential for tearing and/or damaging protective leaching cup 30 during loading in comparison with a material, for example cobalt-cemented tungsten carbide, forming substrate 12 of superabrasive element 10. According to some embodiments, liner 40 may circumferentially surround and/or abut a peripheral portion of superabrasive element 10 with respect to central axis 29. In at least one embodiment, liner 40 may comprise one or more separate segments spaced circumferentially around at least a portion of superabrasive element 10.

In certain embodiments, prior to loading superabrasive element 10 and liner 40 into protective leaching cup 30, protective leaching cup 30 may be preheated to an elevated temperature. For example, protective leaching cup 30 may be heated to a softening point at which the material forming protective leaching cup 30 is suitably softened. Heating protective leaching cup 30 to a suitable temperature may facilitate positioning of superabrasive element 10 within protective leaching cup 30. For example, heating protective leaching cup 30 to a suitable temperature may cause protective leaching cup 30 to expand and/or provide an enhanced ability to deform to ease the placement and positioning of superabrasive element 10 within protective leaching cup 30 and to prevent portions of protective leaching cup 30 from being damaged by superabrasive element 10 and/or liner 40 during loading. Heating protective leaching cup 30 may also enable a more secure or effective seal to be formed between protective leaching cup 30 and superabrasive element 10, thereby further inhibiting passage of a leaching agent between protective leaching cup 30 and superabrasive element 10. Protective leaching cup 30 may be heated to any temperature suitable for softening the material forming protective leaching cup 30 to a desired extent. In at least one embodiment, a protective leaching cup 30 comprising a polyethylene material, such as linear low-density polyethylene (LLDPE), may be heated to a temperature of between about 130° F. and about 180° F.

According to various embodiments disclosed herein, superabrasive element 10 may be processed prior to loading superabrasive element 10 into liner 40 and protective leaching cup 30 in order to provide a smoother surface on an exterior portion of superabrasive element 10. For example, exterior portions of superabrasive table 14 that come into contact with protective leaching cup 30, such as portions of element side surface 15 including superabrasive side surface 22 of superabrasive table 14 and/or substrate side surface 16 of substrate 12, may be processed to reduce surface imperfections. Superabrasive side surface 22 and/or substrate side surface 16 of superabrasive element 10 may be smoothed and/or polished using any suitable mechanical, chemical, and/or electrical processing technique to reduce surface imperfections or improve surface finish, without limitation. For example, superabrasive side surface 22 may be smoothed and/or polished by grinding, lapping, milling, polishing, and/or any other suitable mechanical processing technique. By way of example, U.S. Pat. Nos. 5,967,250; 6,145,608; 5,653,300; 5,447,208; and 5,944,129, the disclosure of each of which is incorporated herein, in its entirety, by this reference, disclose superabrasive elements having smoothed surface portions.

In at least one embodiment, a peripheral surface portion of superabrasive element 10, such as at least a portion of superabrasive side surface 22 and/or substrate side surface 16, may be mechanically smoothed and/or polished using a centerless grinder to a surface roughness of less than approximately 40 μin. In some embodiments, at least a portion of element side surface 15 of superabrasive element 10 may be smoothed to a surface roughness (e.g., mean roughness or root mean square roughness) of between approximately 10 μin and approximately 20 μin, as measured. In additional embodiments, at least a portion of element side surface 15 of superabrasive element 10 may be smoothed to a surface roughness of less than approximately 10 μin.

In certain embodiments, at least a portion of superabrasive side surface 22 and/or substrate side surface 16 may be chemically smoothed and/or polished by exposing superabrasive side surface 22 and/or substrate side surface 16 to a corrosive solution, such as a strongly acidic solution, that reduces surface imperfections on superabrasive side surface 22 and/or substrate side surface 16. In other embodiments, superabrasive side surface 22 and/or substrate side surface 16 may be plated electrolytically and/or using an electroless plating technique (e.g., chemical or auto-catalytic plating). In some embodiments, a portion of protective leaching cup 30, such as side wall 34 in seal region 38, may optionally be smoothed and/or polished using any suitable mechanical, chemical, and/or electrical processing technique.

Due to the improved smoothness of superabrasive side surface 22, substrate side surface 16 and/or at least a portion of protective leaching cup 30, a seal between superabrasive side surface 22 and/or substrate side surface 16 and a portion of protective leaching cup 30, such as side wall 34 in seal region 38, abutting superabrasive side surface 22 and/or substrate side surface 16 may be improved, thereby inhibiting passage of a leaching agent between superabrasive element 10 and protective leaching cup 30. Materials forming protective leaching cup 30 may also be selected and processed so as to improve a seal between at least a portion of superabrasive element 10 and protective leaching cup 30. By way of example, U.S. Patent Application Publication No. 2011/0056141 A1, the disclosure of which is incorporated herein, in its entirety, by this reference, discloses processes and materials for forming protective layers over superabrasive elements.

Subsequent to loading superabrasive element 10 and liner 40 into protective leaching cup 30 and prior to leaching, at least a portion of trapped gases, such as air and/or other gases, may be at least partially evacuated from between superabrasive element 10 and/or liner 40 and protective leaching cup 30. For example, portions of side wall 34 may be pushed outward away from superabrasive element 10 and liner 40 so as to facilitate evacuation of gases trapped within protective leaching cup 30.

By maintaining a seal between superabrasive element 10 and protective leaching cup 30 during leaching, portions of superabrasive element 10 may be prevented or inhibited from being exposed to a leaching agent during leaching, thereby preventing damage, such as corrosion damage, to certain regions of superabrasive element 10, such as substrate 12. Additionally, various regions of superabrasive element 10, such as superabrasive face 20 and/or superabrasive chamfer 24, may not be covered by protective leaching cup 30 and may remain exposed to a leaching agent during leaching, enabling leaching of such regions to achieve a desired leach depth configuration.

Liner 40, which surrounds at least a portion of superabrasive element 10, including at least a portion of substrate 12, may additionally prevent a leaching agent from contacting substrate 12 during and/or following leaching. For example, pinholes, which may be formed in protective leaching cup 30 during ejection of superabrasive element 10 from a leaching apparatus following a leaching procedure, may allow a leaching agent to contact liner 40. Rear wall 42 of liner 40, which is disposed between rear wall 32 of protective leaching cup 30 and rear surface 18 of superabrasive element 10, may inhibit or prevent a leaching agent, such as a leaching agent entering protective leaching cup 30 through rear wall 32, from contacting rear surface 18 of superabrasive element 10. Rounded edge portion 49 and side wall 44 of liner 30 may further prevent a leaching agent from contacting substrate chamfer 28 and/or at least a portion of substrate side surface 16 of superabrasive element 10. Accordingly, liner 40 may further inhibit or prevent damage, such as corrosion damage, to various regions of superabrasive element 10, such as substrate 12, during and/or following leaching.

Figure 7:
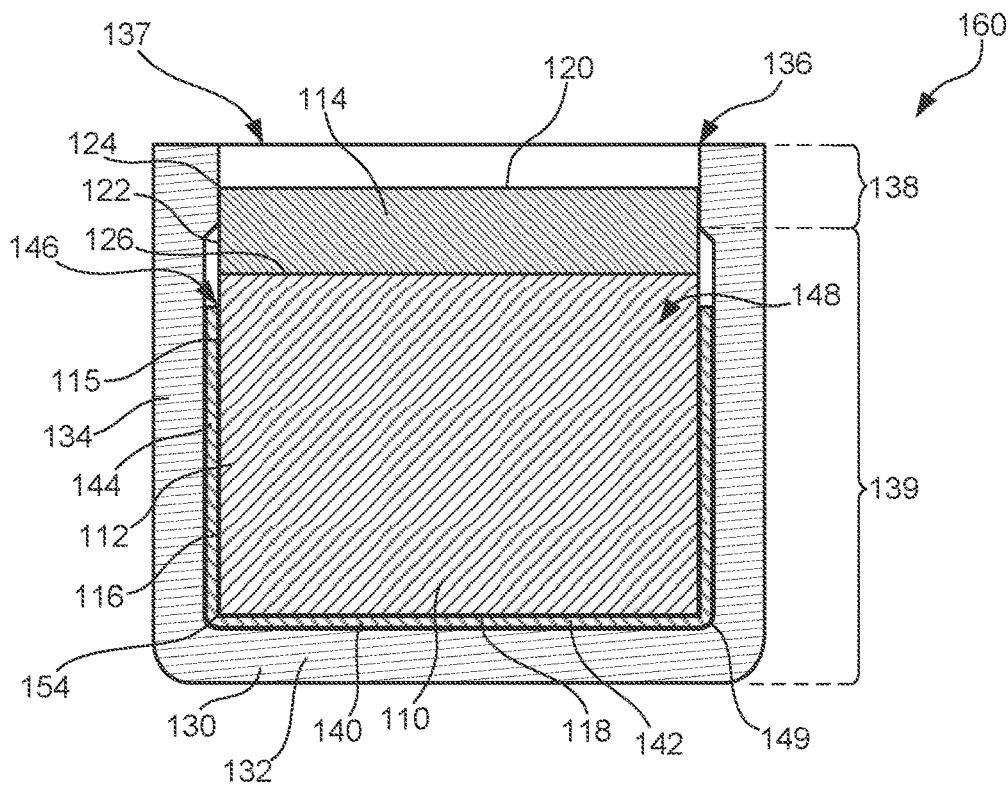
FIG. 7 is a cross-sectional side view of an exemplary superabrasive element leaching assembly according to at least one embodiment.
Figure 8:
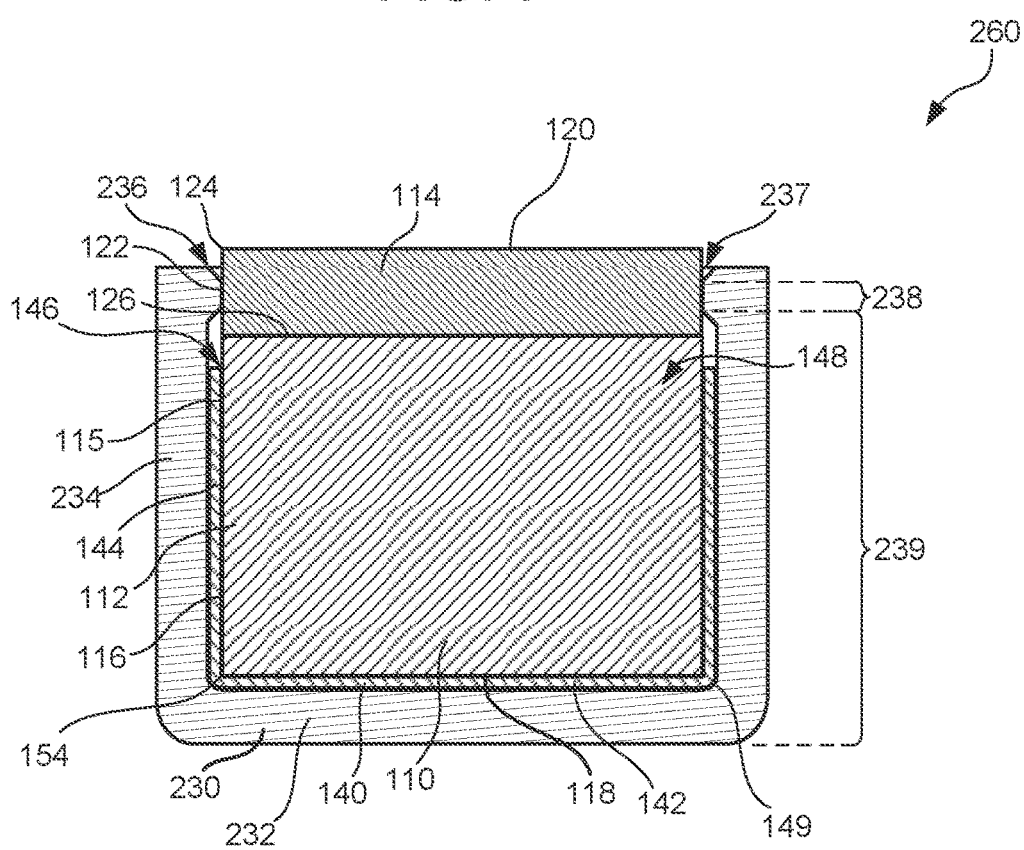
FIG. 8 is a cross-sectional side view of an exemplary superabrasive element leaching assembly according to at least one embodiment.

FIGS. 7 and 8 illustrate exemplary leaching assemblies according to various embodiments. FIG. 7 shows an exemplary leaching assembly 160 comprising superabrasive element 110, protective leaching cup 130, and liner 140 according to at least one embodiment. Liner 140 and protective leaching cup 130 may be utilized for processing superabrasive elements having various surface configurations formed at an intersection of a side surface and a rear surface.

As shown in FIG. 7, superabrasive element 110 may comprise a superabrasive table 114 affixed to or formed upon a substrate 112. Superabrasive table 114 may be affixed to substrate 112 at interface 126. Superabrasive element 110 may comprise a rear surface 118, a superabrasive face 120, and an element side surface 115. In some embodiments, element side surface 115 may include a substrate side surface 116 formed by substrate 112 and a superabrasive side surface 122 formed by superabrasive table 114. Rear surface 118 may be formed by substrate 112. Superabrasive element 110 may also comprise a superabrasive face 120 formed by superabrasive table 114.

According to various embodiments, superabrasive element 110 may also comprise a substrate edge 154 formed by substrate 112. In some embodiments, substrate edge 154 may comprise an angular and/or rounded edge formed at the intersection of substrate side surface 116 and rear surface 118. Any other suitable surface shape may also be formed at the intersection of substrate side surface 116 and rear surface 118, including, without limitation, an arcuate surface (e.g., a radius, an ovoid shape, or any other rounded shape), a sharp edge, a honed edge, and/or combinations of the foregoing. Accordingly to at least one embodiment, superabrasive element 110 may comprise a superabrasive edge 124 formed by superabrasive table 114. In some embodiments, superabrasive edge 124 may comprise an angular and/or rounded edge or any other suitable surface shape, including, without limitation, an arcuate surface (e.g., a radius, an ovoid shape, or any other rounded shape), a sharp edge, a honed edge, and/or combinations of the foregoing, formed at the intersection of superabrasive side surface 122 and superabrasive face 120.

Protective leaching cup 130 may comprise a rear wall 132 and a side wall 134 defining a cavity 137 extending from opening 136. According to various embodiments, protective leaching cup 130 may comprise a seal region 138 and an encapsulating region 139. Seal region 138 may be adjacent opening 136 and encapsulating region 139 may extend from seal region 138 and may include rear wall 132. According to some embodiments, a portion of side wall 134 in seal region 138 may have a different diameter and/or shape than a portion of side wall 134 in encapsulating region 139. For example, a portion of side wall 134 in encapsulating region 139 may have an inner diameter that is greater than an inner diameter of a portion of side wall 134 in seal region 138.

Liner 140 may comprise a rear wall 142 and a side wall 144 defining a cavity 148 configured to surround and/or contact at least a portion of superabrasive element 110. Additionally, liner 140 may comprise a rounded edge portion 149 formed at an intersection of rear wall 142 and side wall 144. Rounded edge portion 149 may comprise any suitable surface shape, such as, for example, an arcuate surface (e.g., a radius), multiple radii, a honed edge, a combination arcuate and flat surface, or any combination of the foregoing. Rear wall 142, side wall 144, and rounded edge portion 149 may each be formed to any suitable shape and thickness, without limitation.

Liner 140 may be formed of any suitable material. For example, liner 140 may comprise a rigid or substantially rigid material. In some embodiments, liner 140 may comprise one or more metallic materials. For example, liner 140 may be formed of one or more refractory metal materials, such as niobium, tantalum, molybdenum, tungsten, rhenium, chromium, vanadium, hafnium, zirconium, and/or any other suitable metallic material or alloy thereof. In additional embodiments, liner 140 may comprise various other suitable metallic materials and/or alloys thereof, such as, for example, precious metals, platinum group metals (e.g., gold and/or platinum), iron, tin, copper, silver, bronze, aluminum, steel and/or steel alloys, or any alloys of one or more of the foregoing. In additional embodiments, liner 140 may comprise one or more polymeric materials. For example, liner 140 may comprise polytetrafluoroethylene (PTFE) and/or any other suitable polymer or resin, without limitation. Liner 140 may also comprise any other suitable material or combination of materials, including, for example, ceramic, glass, a carbon material, a metallic material, a carbon allotrope material, a composite material, an oxide material, a carbide material, and/or any combination of the foregoing.

Liner 140 may be formed using any suitable technique. For example, liner 140 may comprise a metallic material that is shaped through a molding, drawing, machining, milling, grinding, and/or any other suitable metalworking or forming technique. According to some embodiments, a generally disk-shaped blank (e.g., a niobium blank) may be subjected to a drawing operation. During such a drawing operation, a punch may be utilized to force the disk-shaped blank into a corresponding forming die cavity. In at least one embodiment, liner 140 may comprise a polymeric material that is shaped using, for example, a molding operation (e.g., injection molding, blow molding, compression molding, drawing, etc.). In various embodiments, a combination of a metallic material, a polymeric material, and/or any other suitable material may also be utilized to form liner 140. For example, liner 140 may comprise a metallic material (e.g., niobium, steel, etc.) having one or more surfaces coated with a polymeric layer (e.g., PTFE) and/or other suitable material. In other embodiments, liner 140 may be formed on superabrasive element 10 as a coating by spraying, dipping, polymerization, electroplating, chemical vapor deposition, physical vapor deposition, and/or any suitable coating technique, without limitation. Such a coating may be formed on superabrasive element 10 so as to have rounded edge portions formed adjacent more angular portions (e.g., chamfer 28) of superabrasive element 10.

Liner 140 may comprise any suitable size, shape, and geometry configured to surround at least a portion of superabrasive element 110. In at least one embodiment, portions of liner 140 may have a substantially cylindrical outer periphery. Rear wall 142 and side wall 144 may define a cavity 148 within liner 140. Cavity 148 may be shaped to surround at least a portion of superabrasive element 110. An opening 146 may be defined in a portion of liner 140 opposite rear wall 142 such that cavity 148 extends between opening 146 and rear wall 142. According to at least one embodiment, liner 140 may be sized to fit within encapsulating region 139 of protective leaching cup 130.

As shown in FIG. 7, superabrasive element 110 may be positioned within liner 140, and superabrasive element 110 and liner 140 may both be positioned within protective leaching cup 130. Superabrasive element 110 may be positioned within liner 140 such that at least a portion of an outer periphery of superabrasive element 110 is surrounded by protective liner 140. For example, superabrasive element 110 may be positioned within liner 140 so that at least a portion of rear surface 118 of superabrasive element 110 is near rear wall 142 of liner 140 and/or so that at least a portion of side surface 115 of superabrasive element 110 is adjacent side wall 144 of liner 140. For example, side wall 144 of liner 140 may be disposed adjacent substrate side surface 116.

In some embodiments, superabrasive element 110 may contact side wall 144 of liner 140. For example, superabrasive element 110 may be tightly surrounded by liner 140 so as to secure liner 140 to superabrasive element 110. For example, liner 140 may be secured around superabrasive element 110 by press-fitting. According to some embodiments, liner 140 may be bonded or otherwise adhered to at least a portion of side surface 115 and/or rear surface 118 of superabrasive element 110. In additional embodiments, superabrasive element 110 may be less tightly (e.g., removably) surrounded by liner 140, thereby facilitating insertion and/or removal of superabrasive element 110 from liner 140. In some embodiments, liner 140 may be shaped to conform to at least a portion of element side surface 115, rear surface 118, and/or substrate edge 154 such that rear surface 118 of superabrasive element 110 is disposed adjacent to or in contact with at least a portion of rear wall 142 of liner 140 when superabrasive element 110 is disposed within liner 140. In additional embodiments, a gap may be defined between rear wall 142 of liner 140 and rear surface 118 of superabrasive element 110. According to some embodiments, liner 140 may circumferentially surround and/or abut a peripheral portion of superabrasive element 10 with respect to central axis 29. In at least one embodiment, liner 140 may comprise one or more separate segments spaced circumferentially around at least a portion of superabrasive element 10.

Superabrasive element 110 and liner 140 may be positioned within protective leaching cup 130 such that at least a portion of an outer periphery of superabrasive element 110 and at least a portion of an outer periphery of liner 140 are surrounded by protective leaching cup 130. According to some embodiments, superabrasive element 110 and liner 140 may be positioned within protective leaching cup 130 so that rear wall 142 of liner 140 is adjacent rear wall 132 of protective leaching cup 130 and/or so that at least a portion of side wall 144 of liner 140 is adjacent side wall 134 of protective leaching cup 130. Additionally, at least a portion of superabrasive element 110, such as superabrasive table 114 and/or substrate 112, may be positioned adjacent a portion of protective leaching cup 130. For example, seal region 138 of protective leaching cup 130 may be configured to contact at least a portion of element side surface 115 of superabrasive element 110, forming a seal between protective leaching cup 130 and superabrasive element 110 that is partially or fully impermeable to various fluids, such as a leaching material (e.g., a leaching solution).

As shown in FIG. 7, superabrasive element 110 may be positioned within protective leaching cup 130 so that seal region 138 of protective leaching cup 130 contacts and forms a seal with at least a portion of element side surface 115, such as at least a portion of superabrasive side surface 122 and/or at least a portion of substrate side surface 116. In some embodiments, at least a portion of seal region 138 of protective leaching cup 130 may have an inner diameter that is equal to or less than (e.g., when unassembled with superabrasive element 110) an outer diameter of superabrasive element 110. Accordingly, at least a portion of side wall 134 in seal region 138 of protective leaching cup 130 may contact and/or form a seal with at least a portion of superabrasive element 110.

At least a portion of seal region 138 of protective leaching cup 130 which does not contact superabrasive element 110 may extend between a portion of superabrasive table 114, such as superabrasive edge 124, and opening 136 following loading of superabrasive element 110 and liner 140 into protective leaching cup 130. Seal region 138 of protective leaching cup 130 may be configured to contact a portion of superabrasive element 110 and maintain a seal between protective leaching cup 130 and superabrasive element 110 during and/or following exposure of at least a portion of superabrasive element 110 to a leaching agent. For example, seal region 138 is configured to maintain contact with superabrasive side surface 122 of superabrasive table 114 in a situation where superabrasive element 110 migrates toward opening 136 (e.g., during a leaching process).

According to at least one embodiment, rounded edge portion 149 of liner 140 may prevent tearing or otherwise damaging protective leaching cup 130 (e.g., seal region 138) during loading. For example, rounded edge portion 149 of liner 140 may comprise a more rounded and/or gently curving surface in comparison with substrate edge 128 of superabrasive element 110, thereby reducing a potential for tearing and/or damaging protective leaching cup 130 (e.g., seal region 138) during loading. Additionally, in some embodiments, rounded edge portion 149 may be formed of a material that presents a lower potential for tearing and/or damaging protective leaching cup 130 during loading in comparison with a material, for example cobalt-cemented tungsten carbide, forming substrate 112 of superabrasive element 110.

In certain embodiments, prior to loading superabrasive element 110 and liner 140 into protective leaching cup 130, protective leaching cup 130 may be preheated to an elevated temperature. For example, protective leaching cup 130 may be heated to a softening point at which the material forming protective leaching cup 130 is suitably softened so as to facilitate positioning of superabrasive element 110 within protective leaching cup 130.

According to various embodiments disclosed herein, superabrasive element 110 may be processed prior to loading superabrasive element 110 into liner 140 and protective leaching cup 130 in order to provide a smoother surface on an exterior portion of superabrasive element 110. For example, exterior portions of superabrasive table 114 that come into contact with protective leaching cup 130, such as portions of element side surface 115 including superabrasive side surface 122 of superabrasive table 114 and/or substrate side surface 116 of substrate 112, may be processed to reduce surface imperfections. In some embodiments, a portion of protective leaching cup 130, such as side wall 134 in seal region 138, may optionally be smoothed and/or polished using any suitable mechanical, chemical, and/or electrical processing technique. Due to the improved smoothness of superabrasive side surface 122, substrate side surface 116 and/or at least a portion of protective leaching cup 130, a seal between superabrasive side surface 122 and/or substrate side surface 116 and a portion of protective leaching cup 130, such as side wall 134 in seal region 138, abutting superabrasive side surface 122 and/or substrate side surface 116 may be improved, thereby inhibiting passage of a leaching agent between superabrasive element 110 and protective leaching cup 130. Materials forming protective leaching cup 130 may also be selected and processed so as to improve a seal between at least a portion of superabrasive element 110 and protective leaching cup 130.

Subsequent to loading superabrasive element 110 and liner 140 into protective leaching cup 130 and prior to leaching, at least a portion of trapped gases, such as air and/or other gases, may be at least partially evacuated from between superabrasive element 110 and/or liner 140 and protective leaching cup 130. For example, portions of side wall 134 may be pushed outward away from superabrasive element 110 and liner 140 so as to facilitate evacuation of gases trapped within protective leaching cup 130.

By maintaining a seal between superabrasive element 110 and protective leaching cup 130 during leaching, portions of superabrasive element 110 may be prevented or inhibited from being exposed to a leaching agent during leaching, thereby preventing damage, such as corrosion damage, to certain regions of superabrasive element 110, such as substrate 112. Additionally, various regions of superabrasive element 110, such as superabrasive face 120 and/or superabrasive edge 124, may not be covered by protective leaching cup 130 and may remain exposed to a leaching agent during leaching, enabling leaching of such regions to achieve a desired leach depth configuration.

Liner 140, which surrounds at least a portion of superabrasive element 110, including at least a portion of substrate 112, may additionally prevent a leaching agent from contacting substrate 112 during and/or following leaching. For example, pinholes, which may be formed in protective leaching cup 130 during ejection of superabrasive element 110 from a leaching apparatus following a leaching procedure, may allow a leaching agent to contact liner 140. Rear wall 142 of liner 140, which is disposed between rear wall 132 of protective leaching cup 130 and rear surface 118 of superabrasive element 110, may inhibit or prevent a leaching agent, such as a leaching agent entering protective leaching cup 130 through rear wall 132, from contacting rear surface 118 of superabrasive element 110. Rounded edge portion 149 and side wall 144 of liner 130 may further prevent a leaching agent from contacting substrate chamfer 128 and/or at least a portion of substrate side surface 116 of superabrasive element 110. Accordingly, liner 140 may further inhibit or prevent damage, such as corrosion damage, to various regions of superabrasive element 110, such as substrate 112, during and/or following leaching.

FIG. 8 shows an exemplary leaching assembly 260 comprising superabrasive element 110, protective leaching cup 230, and liner 140 according to various embodiments. Liner 140 and protective leaching cup 230 may be utilized for processing superabrasive elements having various surface configurations formed at an intersection of a side surface and a rear surface.

As shown in FIG. 8, superabrasive element 110 may comprise a substrate edge 154 formed by substrate 112. In some embodiments, substrate edge 154 may comprise an angular and/or rounded edge formed at the intersection of substrate side surface 116 and rear surface 118. Any other suitable surface shape may also be formed at the intersection of substrate side surface 116 and rear surface 118, including, without limitation, an arcuate surface (e.g., a radius, an ovoid shape, or any other rounded shape), a sharp edge, a honed edge, and/or combinations of the foregoing. Accordingly to at least one embodiment, superabrasive element 110 may comprise a superabrasive edge 124 formed by superabrasive table 114. In some embodiments, superabrasive edge 124 may comprise an angular and/or rounded edge or any other suitable surface shape, including, without limitation, an arcuate surface (e.g., a radius, an ovoid shape, or any other rounded shape), a sharp edge, a honed edge, and/or combinations of the foregoing, formed at the intersection of superabrasive side surface 122 and superabrasive face 120.

Protective leaching cup 230 may comprise a rear wall 232 and a side wall 234 defining a cavity 237 extending from opening 236. According to various embodiments, protective leaching cup 230 may comprise a seal region 238 and an encapsulating region 239. Seal region 238 may be adjacent opening 236 and encapsulating region 239 may extend from seal region 238 and may include rear wall 232. According to some embodiments, a portion of side wall 234 in seal region 238 may have a different diameter and/or shape than a portion of side wall 234 in encapsulating region 239. For example, a portion of side wall 234 in encapsulating region 239 may have an inner diameter that is greater than an inner diameter of a portion of side wall 234 in seal region 238.

Liner 140 may comprise a rear wall 142 and a side wall 144 defining a cavity 148 configured to surround and/or contact at least a portion of superabrasive element 110. Additionally, liner 140 may comprise a rounded edge portion 149 formed at an intersection of rear wall 142 and side wall 144. Rounded edge portion 149 may comprise any suitable surface shape, such as, for example, an arcuate surface (e.g., a radius), multiple radii, a honed edge, a combination arcuate and flat surface, or any combination of the foregoing. Rear wall 142, side wall 144, and rounded edge portion 149 may each be formed to any suitable shape and thickness, without limitation.

As shown in FIG. 8, superabrasive element 110 may be positioned within liner 140, and superabrasive element 110 and liner 140 may both be positioned within protective leaching cup 230. Superabrasive element 110 may be positioned within liner 140 such that at least a portion of an outer periphery of superabrasive element 110 is surrounded by protective liner 140. For example, superabrasive element 110 may be positioned within liner 140 so that at least a portion of rear surface 118 of superabrasive element 110 is near rear wall 142 of liner 140 and/or so that at least a portion of side surface 115 of superabrasive element 110 is adjacent side wall 144 of liner 140. For example, side wall 144 of liner 140 may be disposed adjacent substrate side surface 116.

In some embodiments, superabrasive element 110 may contact side wall 144 of liner 140. For example, superabrasive element 110 may be tightly surrounded by liner 140 so as to secure liner 140 to superabrasive element 110. For example, liner 140 may be secured around superabrasive element 110 by press-fitting. According to some embodiments, liner 140 may be bonded or otherwise adhered to at least a portion of side surface 115 and/or rear surface 118 of superabrasive element 110. In additional embodiments, superabrasive element 110 may be less tightly (e.g., removably) surrounded by liner 140, thereby facilitating insertion and/or removal of superabrasive element 110 from liner 140. In some embodiments, liner 140 may be shaped to conform to at least a portion of element side surface 115, rear surface 118, and/or substrate edge 154 such that rear surface 118 of superabrasive element 110 is disposed adjacent to or in contact with at least a portion of rear wall 142 of liner 140 when superabrasive element 110 is disposed within liner 140. In additional embodiments, a gap may be defined between rear wall 142 of liner 140 and rear surface 118 of superabrasive element 110. According to some embodiments, liner 140 may circumferentially surround and/or abut a peripheral portion of superabrasive element 10 with respect to central axis 29. In at least one embodiment, liner 140 may comprise one or more separate segments spaced circumferentially around at least a portion of superabrasive element 10.

Superabrasive element 110 and liner 140 may be positioned within protective leaching cup 230 such that at least a portion of an outer periphery of superabrasive element 110 and at least a portion of an outer periphery of liner 140 are surrounded by protective leaching cup 230. According to some embodiments, superabrasive element 110 and liner 140 may be positioned within protective leaching cup 230 so that rear wall 142 of liner 140 is adjacent rear wall 232 of protective leaching cup 230 and/or so that at least a portion of side wall 144 of liner 140 is adjacent side wall 234 of protective leaching cup 230. Additionally, at least a portion of superabrasive element 110, such as superabrasive table 114 and/or substrate 112, may be positioned adjacent a portion of protective leaching cup 230. For example, seal region 138 of protective leaching cup 230 may be configured to contact at least a portion of element side surface 115 of superabrasive element 110, forming a seal between protective leaching cup 230 and superabrasive element 110 that is partially or fully impermeable to various fluids, such as a leaching material (e.g., a leaching solution).

As shown in FIG. 8, superabrasive element 110 may be positioned within protective leaching cup 230 so that seal region 238 of protective leaching cup 230 contacts and forms a seal with at least a portion of element side surface 115, such as at least a portion of superabrasive side surface 122 and/or at least a portion of substrate side surface 116. In some embodiments, at least a portion of seal region 238 of protective leaching cup 230 may have an inner diameter that is equal to or less than (e.g., when unassembled with superabrasive element 110) an outer diameter of superabrasive element 110. Accordingly, at least a portion of side wall 234 in seal region 238 of protective leaching cup 230 may contact and/or form a seal with at least a portion of superabrasive element 110.

According to at least one embodiment, rounded edge portion 149 of liner 140 may prevent tearing or otherwise damaging protective leaching cup 230 (e.g., seal region 238) during loading. For example, rounded edge portion 149 of liner 140 may comprise a more rounded and/or gently curving surface in comparison with substrate edge 128 of superabrasive element 110, thereby reducing a potential for tearing and/or damaging protective leaching cup 230 (e.g., seal region 238) during loading. Additionally, in some embodiments, rounded edge portion 149 may be formed of a material that presents a lower potential for tearing and/or damaging protective leaching cup 230 during loading in comparison with a material, for example cobalt-cemented tungsten carbide, forming substrate 112 of superabrasive element 110.

In certain embodiments, prior to loading superabrasive element 110 and liner 140 into protective leaching cup 230, protective leaching cup 230 may be preheated to an elevated temperature. For example, protective leaching cup 230 may be heated to a softening point at which the material forming protective leaching cup 230 is suitably softened so as to facilitate positioning of superabrasive element 110 within protective leaching cup 230.

According to various embodiments disclosed herein, superabrasive element 110 may be processed prior to loading superabrasive element 110 into liner 140 and protective leaching cup 230 in order to provide a smoother surface on an exterior portion of superabrasive element 110. For example, exterior portions of superabrasive table 114 that come into contact with protective leaching cup 230, such as portions of element side surface 115 including superabrasive side surface 122 of superabrasive table 114 and/or substrate side surface 116 of substrate 112, may be processed to reduce surface imperfections. In some embodiments, a portion of protective leaching cup 230, such as side wall 234 in seal region 238, may optionally be smoothed and/or polished using any suitable mechanical, chemical, and/or electrical processing technique. Due to the improved smoothness of superabrasive side surface 122, substrate side surface 116 and/or at least a portion of protective leaching cup 230, a seal between superabrasive side surface 122 and/or substrate side surface 116 and a portion of protective leaching cup 230, such as side wall 234 in seal region 238, abutting superabrasive side surface 122 and/or substrate side surface 116 may be improved, thereby inhibiting passage of a leaching agent between superabrasive element 110 and protective leaching cup 230. Materials forming protective leaching cup 230 may also be selected and processed so as to improve a seal between at least a portion of superabrasive element 110 and protective leaching cup 230.

Subsequent to loading superabrasive element 110 and liner 140 into protective leaching cup 230 and prior to leaching, at least a portion of trapped gases, such as air and/or other gases, may be at least partially evacuated from between superabrasive element 110 and/or liner 140 and protective leaching cup 230. For example, portions of side wall 234 may be pushed outward away from superabrasive element 110 and liner 140 so as to facilitate evacuation of gases trapped within protective leaching cup 230.

By maintaining a seal between superabrasive element 110 and protective leaching cup 230 during leaching, portions of superabrasive element 110 may be prevented or inhibited from being exposed to a leaching agent during leaching, thereby preventing damage, such as corrosion damage, to certain regions of superabrasive element 110, such as substrate 112. Additionally, various regions of superabrasive element 110, such as superabrasive face 120, superabrasive edge 124, and/or at least a portion of superabrasive side surface 122 may not be covered by protective leaching cup 230 and may remain exposed to a leaching agent during leaching, enabling leaching of such regions to achieve a desired leach depth configuration. According to some embodiments, as illustrated in FIG. 8, at least a portion of superabrasive side surface 122 extending between seal region 238 of protective leaching cup 230 and superabrasive edge 124 of superabrasive element 110 may be exposed to a leaching agent during leaching.

Liner 140, which surrounds at least a portion of superabrasive element 110, including at least a portion of substrate 112, may additionally prevent a leaching agent from contacting substrate 112 during and/or following leaching. For example, pinholes, which may be formed in protective leaching cup 230 during ejection of superabrasive element 110 from a leaching apparatus following a leaching procedure, may allow a leaching agent to contact liner 140. Rear wall 142 of liner 140, which is disposed between rear wall 232 of protective leaching cup 230 and rear surface 118 of superabrasive element 110, may inhibit or prevent a leaching agent, such as a leaching agent entering protective leaching cup 230 through rear wall 232, from contacting rear surface 118 of superabrasive element 110. Rounded edge portion 149 and side wall 144 of liner 230 may further prevent a leaching agent from contacting substrate chamfer 128 and/or at least a portion of substrate side surface 116 of superabrasive element 110. Accordingly, liner 140 may further inhibit or prevent damage, such as corrosion damage, to various regions of superabrasive element 110, such as substrate 112, during and/or following leaching.

Figure 9:
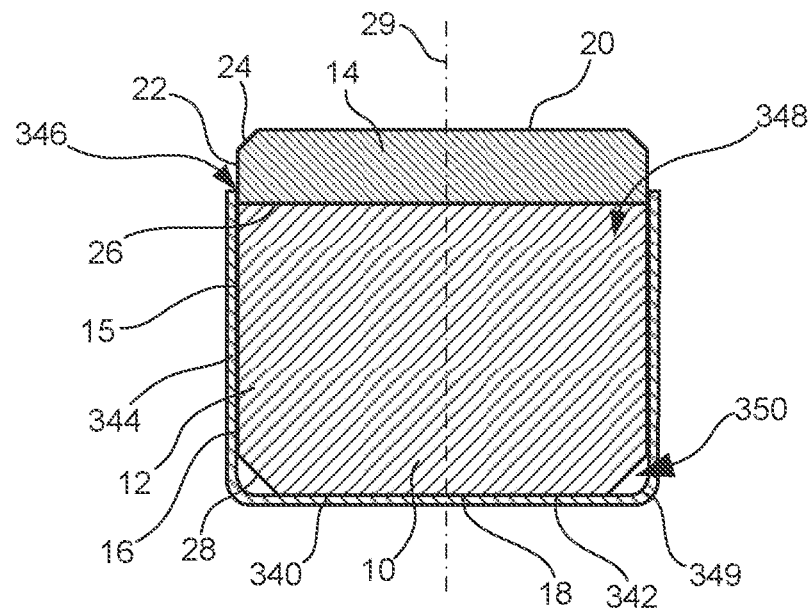
FIG. 9 is a cross-sectional side view of an exemplary superabrasive element positioned within an exemplary liner according to at least one embodiment.

FIGS. 9-14 illustrate exemplary liners surrounding superabrasive elements according to various embodiments. Such exemplary liners may be utilized in various leaching assemblies as disclosed herein. As shown in FIG. 9, liner 340 may comprise a rear wall 342 and a side wall 344 defining a cavity 348 configured to surround and/or contact at least a portion of superabrasive element 10. Additionally, liner 340 may comprise a rounded edge portion 349 formed at an intersection of rear wall 342 and side wall 344. Rounded edge portion 349 may comprise any suitable surface shape, such as, for example, an arcuate surface (e.g., a radius, an ovoid shape, or any other rounded shape), multiple radii, a honed edge, a combination arcuate and flat surface, or any combination of the foregoing. Rear wall 342, side wall 344, and rounded edge portion 349 may each be formed to any suitable thickness, without limitation.

Liner 340 may be formed of any suitable material. For example, liner 340 may comprise a rigid or substantially rigid material. In some embodiments, liner 340 may comprise one or more metallic materials. For example, liner 340 may be formed of one or more refractory metal materials, such as niobium, tantalum, molybdenum, tungsten, rhenium, chromium, vanadium, hafnium, zirconium, and/or any other suitable metallic material or alloy thereof. In additional embodiments, liner 340 may comprise various other suitable metallic materials and/or alloys thereof, such as, for example, precious metals, platinum group metals (e.g., gold and/or platinum), iron, tin, copper, silver, bronze, aluminum, steel and/or steel alloys, or any alloys of one or more of the foregoing. In additional embodiments, liner 340 may comprise one or more polymeric materials. For example, liner 340 may comprise polytetrafluoroethylene (PTFE) and/or any other suitable polymer or resin, without limitation. Liner 340 may also comprise any other suitable material or combination of materials, including, for example, ceramic, glass, a carbon material, a metallic material, a carbon allotrope material, a composite material, an oxide material, a carbide material, and/or any combination of the foregoing.

Liner 340 may be formed using any suitable technique. For example, liner 340 may comprise a metallic material that is shaped through a molding, drawing, machining, milling, grinding, and/or any other suitable metalworking or forming technique. According to some embodiments, a generally disk-shaped blank (e.g., a niobium blank) may be subjected to a drawing operation. During such a drawing operation, a punch may be utilized to force the disk-shaped blank into a corresponding forming die cavity. In at least one embodiment, liner 340 may comprise a polymeric material that is shaped using, for example, a molding operation (e.g., injection molding, blow molding, compression molding, drawing, etc.). In various embodiments, a combination of a metallic material, a polymeric material, and/or any other suitable material may also be utilized to form liner 340. For example, liner 340 may comprise a metallic material (e.g., niobium, steel, etc.) having one or more surfaces coated with a polymeric layer (e.g., PTFE) and/or other suitable material. In other embodiments, liner 340 may be formed on superabrasive element 10 as a coating by spraying, dipping, polymerization, electroplating, chemical vapor deposition, physical vapor deposition, and/or any suitable coating technique, without limitation. Such a coating may be formed on superabrasive element 10 so as to have rounded edge portions formed adjacent more angular portions (e.g., chamfer 28) of superabrasive element 10.

Liner 340 may comprise any suitable size, shape, and geometry configured to surround at least a portion of superabrasive element 10. In at least one embodiment, portions of liner 340 may have a substantially cylindrical outer periphery surrounding central axis 29, as illustrated in FIG. 9. Rear wall 342 and side wall 344 may define a cavity 348 within liner 340. Cavity 348 may be shaped to surround at least a portion of superabrasive element 10. An opening 346 may be defined in a portion of liner 340 opposite rear wall 342 such that cavity 348 extends between opening 346 and rear wall 342. According to at least one embodiment, liner 340 may be sized to fit within an encapsulating region of a protective leaching cup (e.g., encapsulating region 39 of protective leaching cup 30 in FIG. 6).

As shown in FIG. 9, superabrasive element 10 may be positioned within liner 340 such that at least a portion of an outer periphery of superabrasive element 10 is surrounded by protective liner 340. For example, superabrasive element 10 may be positioned within liner 340 so that at least a portion of rear surface 18 of superabrasive element 10 is adjacent rear wall 342 of liner 340 and/or so that at least a portion of side surface 15 of superabrasive element 10 is adjacent side wall 344 of liner 340. For example, side wall 344 of liner 340 may be disposed adjacent substrate side surface 16. In at least one embodiment, side wall 344 of liner 340 may extend adjacent substrate side surface 16 to a position adjacent interface 26 between substrate 12 and superabrasive table 14 of superabrasive element 10. According to certain embodiments, side wall 344 of liner 340 may additionally extend adjacent at least a portion of superabrasive table 14, as illustrated in FIG. 9. Accordingly, in addition to protecting substrate 12 of superabrasive element 10, liner 340 may inhibit or prevent a leaching agent from contacting at least a portion of interface 26 and/or superabrasive table 14.

In some embodiments, superabrasive element 10 may contact side wall 344 of liner 340. For example, superabrasive element 10 may be tightly surrounded by liner 340 so as to secure liner 340 to superabrasive element 10. For example, liner 340 may be secured around superabrasive element 10 by press-fitting. According to some embodiments, liner 340 may be bonded or otherwise adhered to at least a portion of side surface 15 and/or at least a portion of rear surface 18 of superabrasive element 10. In additional embodiments, superabrasive element 10 may be less tightly (e.g., removably) surrounded by liner 340, thereby facilitating insertion and/or removal of superabrasive element 10 from liner 340. In some embodiments, a gap 350 may be defined between rounded edge portion 349 of liner 340 and chamfer 28 of superabrasive element 10. For example, when superabrasive element 10 is disposed within liner 340 such that element side surface 15 and rear surface 18 of superabrasive element 10 are respectively positioned adjacent side wall 344 and rear wall 342 of liner 340, chamfer 28 of superabrasive element 10 may be spaced away from an inner surface of rounded edge portion 349 so as to define gap 350. According to some embodiments, liner 340 may circumferentially surround and/or abut a peripheral portion of superabrasive element 10 with respect to central axis 29. In at least one embodiment, liner 340 may comprise one or more separate segments spaced circumferentially around at least a portion of superabrasive element 10.

Figure 10:
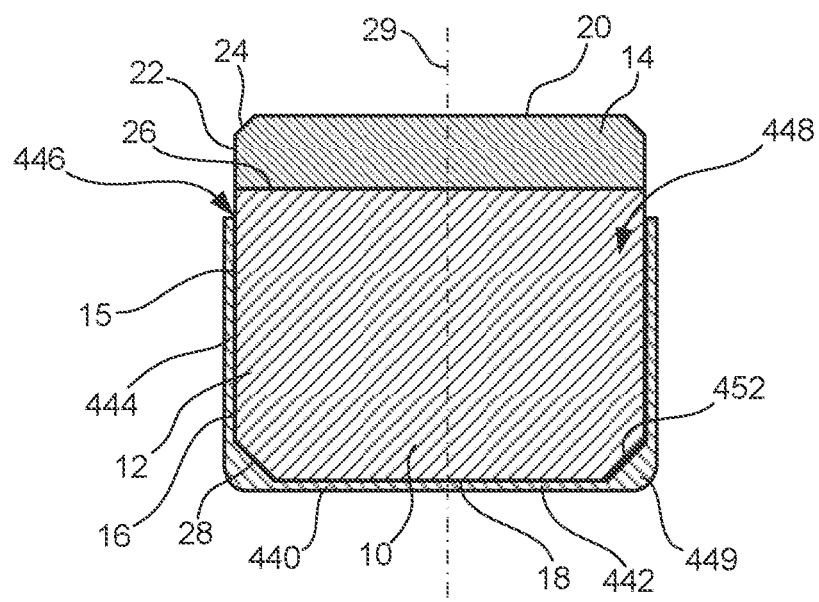
FIG. 10 is a cross-sectional side view of an exemplary superabrasive element positioned within an exemplary liner according to at least one embodiment.

FIG. 10 shows a liner 440 surrounding a superabrasive element 10, according to various embodiments. Liner 440 may comprise a rear wall 442 and a side wall 444 defining a cavity 448 configured to surround and/or contact at least a portion of superabrasive element 10. Additionally, liner 440 may comprise a rounded edge portion 449 formed at an intersection of rear wall 442 and side wall 444. Rounded edge portion 449 may comprise any suitable surface shape, such as, for example, an arcuate surface (e.g., a radius, an ovoid shape, or any other rounded shape), multiple radii, a honed edge, a combination arcuate and flat surface, or any combination of the foregoing. Rear wall 442, side wall 444, and rounded edge portion 449 may each be formed to any suitable thickness, without limitation.

Liner 440 may be formed of any suitable material. For example, liner 440 may comprise a rigid or substantially rigid material. In some embodiments, liner 440 may comprise one or more metallic materials. For example, liner 440 may be formed of one or more refractory metal materials, such as niobium, tantalum, molybdenum, tungsten, rhenium, chromium, vanadium, hafnium, zirconium, and/or any other suitable metallic material or alloy thereof. In additional embodiments, liner 440 may comprise various other suitable metallic materials and/or alloys thereof, such as, for example, precious metals, platinum group metals (e.g., gold and/or platinum), iron, tin, copper, silver, bronze, aluminum, steel and/or steel alloys, or any alloys of one or more of the foregoing. In additional embodiments, liner 440 may comprise one or more polymeric materials. For example, liner 440 may comprise polytetrafluoroethylene (PTFE) and/or any other suitable polymer or resin, without limitation. Liner 440 may also comprise any other suitable material or combination of materials, including, for example, ceramic, glass, a carbon material, a metallic material, a carbon allotrope material, a composite material, an oxide material, a carbide material, and/or any combination of the foregoing.

Liner 440 may be formed using any suitable technique. For example, liner 440 may comprise a metallic material that is shaped through a molding, drawing, machining, milling, grinding, and/or any other suitable metalworking or forming technique. According to some embodiments, a generally disk-shaped blank (e.g., a niobium blank) may be subjected to a drawing operation. During such a drawing operation, a punch may be utilized to force the disk-shaped blank into a corresponding forming die cavity. In at least one embodiment, liner 440 may comprise a polymeric material that is shaped using, for example, a molding operation (e.g., injection molding, blow molding, compression molding, drawing, etc.). In various embodiments, a combination of a metallic material, a polymeric material, and/or any other suitable material may also be utilized to form liner 440. For example, liner 440 may comprise a metallic material (e.g., niobium, steel, etc.) having one or more surfaces coated with a polymeric layer (e.g., PTFE) and/or other suitable material. In other embodiments, liner 440 may be formed on superabrasive element 10 as a coating by spraying, dipping, polymerization, electroplating, chemical vapor deposition, physical vapor deposition, and/or any suitable coating technique, without limitation. Such a coating may be formed on superabrasive element 10 so as to have rounded edge portions formed adjacent more angular portions (e.g., chamfer 28) of superabrasive element 10.

Liner 440 may comprise any suitable size, shape, and geometry configured to surround at least a portion of superabrasive element 10. In at least one embodiment, portions of liner 440 may have a substantially cylindrical outer periphery surrounding central axis 29, as illustrated in FIG. 10. Rear wall 442 and side wall 444 may define a cavity 448 within liner 440. Cavity 448 may be shaped to surround at least a portion of superabrasive element 10. An opening 446 may be defined in a portion of liner 440 opposite rear wall 442 such that cavity 448 extends between opening 446 and rear wall 442. According to at least one embodiment, liner 440 may be sized to fit within an encapsulating region of a protective leaching cup (e.g., encapsulating region 39 of protective leaching cup 30 in FIG. 6).

As shown in FIG. 10, superabrasive element 10 may be positioned within liner 440 such that at least a portion of an outer periphery of superabrasive element 10 is surrounded by protective liner 440. For example, superabrasive element 10 may be positioned within liner 440 so that at least a portion of rear surface 18 of superabrasive element 10 is adjacent rear wall 442 of liner 440 and/or so that at least a portion of side surface 15 of superabrasive element 10 is adjacent side wall 444 of liner 440. For example, side wall 444 of liner 440 may be disposed adjacent substrate side surface 16 of superabrasive element 10.

In some embodiments, superabrasive element 10 may contact side wall 444 of liner 440. For example, superabrasive element 10 may be tightly surrounded by liner 440 so as to secure liner 440 to superabrasive element 10. For example, liner 440 may be secured around superabrasive element 10 by press-fitting. According to some embodiments, liner 440 may be bonded or otherwise adhered to at least a portion of side surface 15 and/or rear surface 18 of superabrasive element 10. In additional embodiments, superabrasive element 10 may be less tightly (e.g., removably) surrounded by liner 440, thereby facilitating insertion and/or removal of superabrasive element 10 from liner 440. As shown in FIG. 10, liner 440 may additionally comprise a sloped surface 452 extending between side wall 444 and rear wall 442 in an inner portion of liner 440. When superabrasive element 10 is disposed within liner 440 such that element side surface 15 and rear surface 18 of superabrasive element 10 are respectively positioned adjacent side wall 444 and rear wall 442 of liner 440, substrate chamfer 28 of superabrasive element 10 may be located adjacent to and/or in contact with sloped surface 452 of liner 440. According to at least one embodiment, sloped surface 452 may substantially conform to a shape of substrate chamfer 28. According to some embodiments, liner 440 may circumferentially surround and/or abut a peripheral portion of superabrasive element 10 with respect to central axis 29. In at least one embodiment, liner 440 may comprise one or more separate segments spaced circumferentially around at least a portion of superabrasive element 10.

Figure 11:
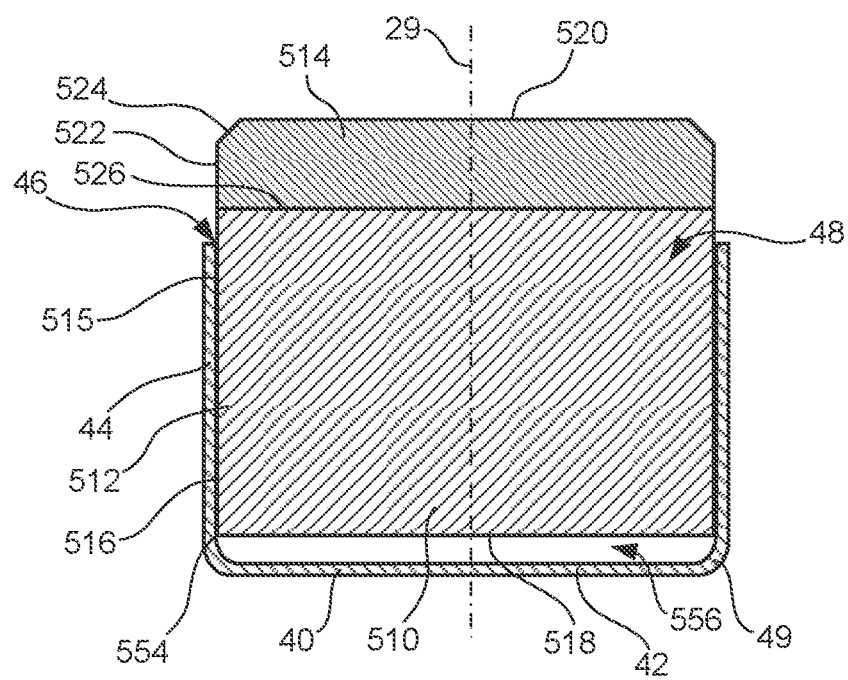
FIG. 11 is a cross-sectional side view of an exemplary superabrasive element positioned within an exemplary liner according to at least one embodiment.

FIG. 11 shows a liner 40 surrounding a superabrasive element 510, according to various embodiments. Liner 40 may be utilized for processing superabrasive elements having various surface configurations formed at an intersection of a side surface and a rear surface. As shown in FIG. 11, superabrasive element 510 may comprise a superabrasive table 514 affixed to or formed upon a substrate 512. Superabrasive table 514 may be affixed to substrate 512 at interface 526. Superabrasive element 510 may comprise a rear surface 518, a superabrasive face 520, and an element side surface 515. In some embodiments, element side surface 515 may include a substrate side surface 516 formed by substrate 512 and a superabrasive side surface 522 formed by superabrasive table 514. Rear surface 518 may be formed by substrate 512. Superabrasive element 510 may also comprise a superabrasive face 520 and a superabrasive chamfer 524 formed by superabrasive table 514.

According to various embodiments, superabrasive element 510 may also comprise a substrate edge 554 formed by substrate 512. In some embodiments, substrate edge 554 may comprise an angular and/or rounded edge formed at the intersection of substrate side surface 516 and rear surface 518. Any other suitable surface shape may also be formed at the intersection of substrate side surface 516 and rear surface 518, including, without limitation, an arcuate surface (e.g., a radius, an ovoid shape, or any other rounded shape), a sharp edge, a honed edge, and/or combinations of the foregoing.

As shown in FIG. 11, a superabrasive element 510 may be positioned within liner 40 such that at least a portion of an outer periphery of superabrasive element 510 is surrounded by protective liner 40. For example, superabrasive element 510 may be positioned within liner 40 so that at least a portion of rear surface 518 of superabrasive element 510 is near rear wall 42 of liner 40 and/or so that at least a portion of side surface 515 of superabrasive element 510 is adjacent side wall 44 of liner 40. For example, side wall 44 of liner 40 may be disposed adjacent substrate side surface 516.

In some embodiments, superabrasive element 510 may contact side wall 44 of liner 40. For example, superabrasive element 510 may be tightly surrounded by liner 40 so as to secure liner 40 to superabrasive element 510. For example, liner 40 may be secured around superabrasive element 510 by press-fitting. According to some embodiments, liner 40 may be bonded or otherwise adhered to at least a portion of side surface 515 and/or rear surface 518 of superabrasive element 510. In additional embodiments, superabrasive element 510 may be less tightly (e.g., removably) surrounded by liner 40, thereby facilitating insertion and/or removal of superabrasive element 510 from liner 40. When superabrasive element 510 is disposed within liner 40 such that element side surface 515 and rear surface 518 of superabrasive element 510 are respectively positioned adjacent side wall 44 and/or near rear wall 42 of liner 40, a gap 556 may be defined between rear wall 42 of liner 40 and rear surface 518 of superabrasive element 510. In additional embodiments, an inner surface portion of liner 40 may be shaped such that rear surface 518 of superabrasive element 510 is disposed adjacent to or in contact with at least a portion of rear wall 42 of liner 40. For example, liner 40 may be shaped to conform to at least a portion of element side surface 515, rear surface 518, and/or substrate edge 554. According to some embodiments, liner 540 may circumferentially surround and/or abut a peripheral portion of superabrasive element 10 with respect to central axis 29. In at least one embodiment, liner 540 may comprise one or more separate segments spaced circumferentially around at least a portion of superabrasive element 10.

Figure 12:
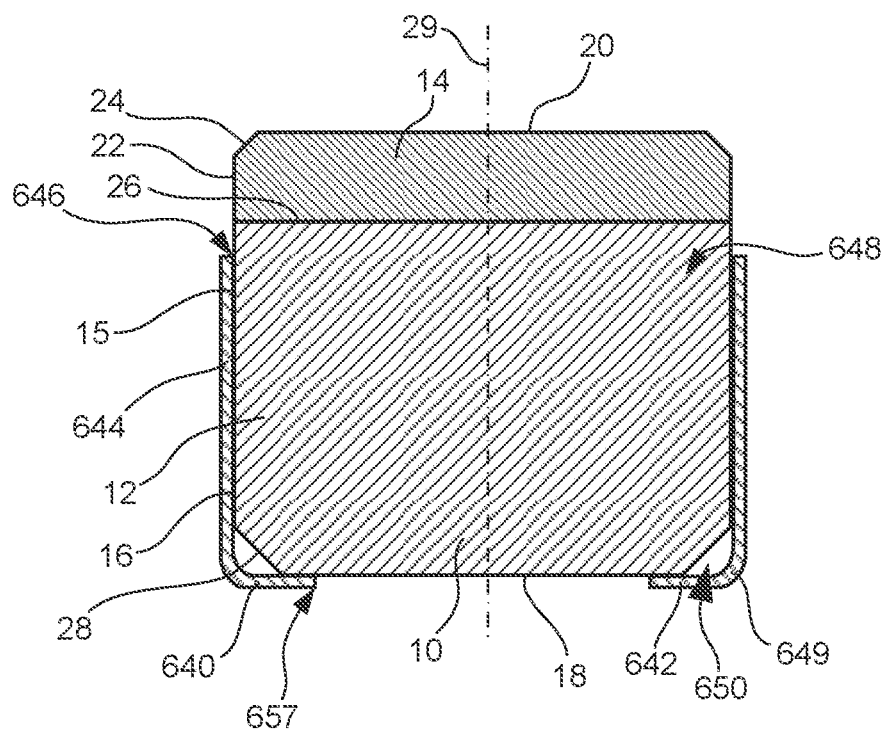
FIG. 12 is a cross-sectional side view of an exemplary superabrasive element positioned within an exemplary liner according to at least one embodiment.

FIG. 12 shows a liner 640 surrounding a superabrasive element 10, according to various embodiments. Liner 640 may comprise a rear wall 642 and a side wall 644 defining a cavity 648 configured to surround and/or contact at least a portion of superabrasive element 10. Additionally, liner 640 may comprise a rounded edge portion 649 formed at an intersection of rear wall 642 and side wall 644. Rounded edge portion 649 may comprise any suitable surface shape, such as, for example, an arcuate surface (e.g., a radius, an ovoid shape, or any other rounded shape), multiple radii, a honed edge, a combination arcuate and flat surface, or any combination of the foregoing. Rear wall 642, side wall 644, and rounded edge portion 649 may each be formed to any suitable thickness, without limitation. According to some embodiments, at least one opening may be defined in liner 640 in addition to opening 646. For example, as shown in FIG. 12, an opening 657 may be defined in rear wall 642. Opening 642 may be open to cavity 648.

Liner 640 may be formed of any suitable material. For example, liner 640 may comprise a rigid or substantially rigid material. In some embodiments, liner 640 may comprise one or more metallic materials. For example, liner 640 may be formed of one or more refractory metal materials, such as niobium, tantalum, molybdenum, tungsten, rhenium, chromium, vanadium, hafnium, zirconium, and/or any other suitable metallic material or alloy thereof. In additional embodiments, liner 640 may comprise various other suitable metallic materials and/or alloys thereof, such as, for example, precious metals, platinum group metals (e.g., gold and/or platinum), iron, tin, copper, silver, bronze, aluminum, steel and/or steel alloys, or any alloys of one or more of the foregoing. In additional embodiments, liner 640 may comprise one or more polymeric materials. For example, liner 640 may comprise polytetrafluoroethylene (PTFE) and/or any other suitable polymer or resin, without limitation. Liner 640 may also comprise any other suitable material or combination of materials, including, for example, ceramic, glass, a carbon material, a metallic material, a carbon allotrope material, a composite material, an oxide material, a carbide material, and/or any combination of the foregoing.

Liner 640 may be formed using any suitable technique. For example, liner 640 may comprise a metallic material that is shaped through a molding, drawing, machining, milling, grinding, and/or any other suitable metalworking or forming technique. According to some embodiments, a generally disk-shaped blank (e.g., a niobium blank) may be subjected to a drawing operation. During such a drawing operation, a punch may be utilized to force the disk-shaped blank into a corresponding forming die cavity. In at least one embodiment, liner 640 may comprise a polymeric material that is shaped using, for example, a molding operation (e.g., injection molding, blow molding, compression molding, drawing, etc.). In various embodiments, a combination of a metallic material, a polymeric material, and/or any other suitable material may also be utilized to form liner 640. For example, liner 640 may comprise a metallic material (e.g., niobium, steel, etc.) having one or more surfaces coated with a polymeric layer (e.g., PTFE) and/or other suitable material. In other embodiments, liner 640 may be formed on superabrasive element 10 as a coating by spraying, dipping, polymerization, electroplating, chemical vapor deposition, physical vapor deposition, and/or any suitable coating technique, without limitation. Such a coating may be formed on superabrasive element 10 so as to have rounded edge portions formed adjacent more angular portions (e.g., chamfer 28) of superabrasive element 10.

Liner 640 may comprise any suitable size, shape, and geometry configured to surround at least a portion of superabrasive element 10. In at least one embodiment, portions of liner 640 may have a substantially cylindrical outer periphery surrounding central axis 29, as illustrated in FIG. 12. Rear wall 642 and side wall 644 may define a cavity 648 within liner 640. Cavity 648 may be shaped to surround at least a portion of superabrasive element 10. An opening 646 may be defined in a portion of liner 640 opposite rear wall 642 such that cavity 648 extends between opening 646 and rear wall 642. According to at least one embodiment, liner 640 may be sized to fit within an encapsulating region of a protective leaching cup (e.g., encapsulating region 39 of protective leaching cup 30 in FIG. 6).

As shown in FIG. 12, superabrasive element 10 may be positioned within liner 640 such that at least a portion of an outer periphery of superabrasive element 10 is surrounded by protective liner 640. For example, superabrasive element 10 may be positioned within liner 640 so that at least a portion of rear surface 18 of superabrasive element 10 is adjacent rear wall 642 of liner 640 and/or so that at least a portion of side surface 15 of superabrasive element 10 is adjacent side wall 644 of liner 640. For example, side wall 644 of liner 640 may be disposed adjacent substrate side surface 16.

In some embodiments, superabrasive element 10 may contact side wall 644 of liner 640. For example, superabrasive element 10 may be tightly surrounded by liner 640 so as to secure liner 640 to superabrasive element 10. For example, liner 640 may be secured around superabrasive element 10 by press-fitting. According to some embodiments, liner 640 may be bonded or otherwise adhered to at least a portion of side surface 15 and/or at least a portion of rear surface 18 of superabrasive element 10. In additional embodiments, superabrasive element 10 may be less tightly (e.g., removably) surrounded by liner 640, thereby facilitating insertion and/or removal of superabrasive element 10 from liner 640.

In some embodiments, a gap 650 may be defined between rounded edge portion 649 of liner 640 and chamfer 28 of superabrasive element 10. For example, when superabrasive element 10 is disposed within liner 640 such that element side surface 15 and rear surface 18 of superabrasive element 10 are respectively positioned adjacent side wall 644 and rear wall 642 of liner 640, chamfer 28 of superabrasive element 10 may be spaced away from an inner surface of rounded edge portion 649 so as to define gap 650. According to some embodiments, opening 657, which is defined in liner 640 so as to be open to cavity 648, may facilitate loading of superabrasive element 10 into liner 640 and/or may prevent excess gases and/or fluids from becoming trapped between liner 640 and superabrasive element 10. According to some embodiments, liner 640 may circumferentially surround and/or abut a peripheral portion of superabrasive element 10 with respect to central axis 29. In at least one embodiment, liner 640 may comprise one or more separate segments spaced circumferentially around at least a portion of superabrasive element 10.

Figure 13:
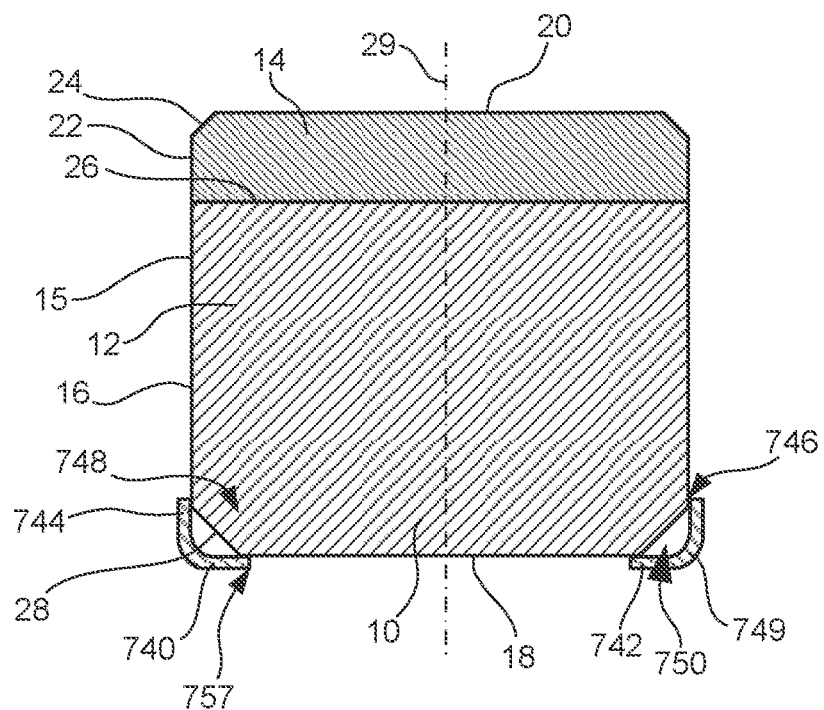
FIG. 13 is a cross-sectional side view of an exemplary superabrasive element positioned within an exemplary liner according to at least one embodiment.

FIG. 13 shows a liner 740 surrounding a portion of superabrasive element 10, according to various embodiments. Liner 740 may comprise a rear wall 742 and a side wall 744 defining a cavity 748 configured to surround and/or contact at least a portion of superabrasive element 10. Additionally, liner 740 may comprise a rounded edge portion 749 formed at an intersection of rear wall 742 and side wall 744. Rounded edge portion 749 may comprise any suitable surface shape, such as, for example, an arcuate surface (e.g., a radius, an ovoid shape, or any other rounded shape), multiple radii, a honed edge, a combination arcuate and flat surface, or any combination of the foregoing. Rear wall 742, side wall 744, and rounded edge portion 749 may each be formed to any suitable thickness, without limitation. According to some embodiments, an opening 757 may be defined in rear wall 742. Opening 757 may be open to cavity 748.

Liner 740 may be formed of any suitable material. For example, liner 740 may comprise a rigid or substantially rigid material. In some embodiments, liner 740 may comprise one or more metallic materials. For example, liner 740 may be formed of one or more refractory metal materials, such as niobium, tantalum, molybdenum, tungsten, rhenium, chromium, vanadium, hafnium, zirconium, and/or any other suitable metallic material or alloy thereof. In additional embodiments, liner 740 may comprise various other suitable metallic materials and/or alloys thereof, such as, for example, precious metals, platinum group metals (e.g., gold and/or platinum), iron, tin, copper, silver, bronze, aluminum, steel and/or steel alloys, or any alloys of one or more of the foregoing. In additional embodiments, liner 740 may comprise one or more polymeric materials. For example, liner 740 may comprise polytetrafluoroethylene (PTFE) and/or any other suitable polymer or resin, without limitation. Liner 740 may also comprise any other suitable material or combination of materials, including, for example, ceramic, glass, a carbon material, a metallic material, a carbon allotrope material, a composite material, an oxide material, a carbide material, and/or any combination of the foregoing.

Liner 740 may be formed using any suitable technique. For example, liner 740 may comprise a metallic material that is shaped through a molding, drawing, machining, milling, grinding, and/or any other suitable metalworking or forming technique. According to some embodiments, a generally disk-shaped blank (e.g., a niobium blank) may be subjected to a drawing operation. During such a drawing operation, a punch may be utilized to force the disk-shaped blank into a corresponding forming die cavity. In at least one embodiment, liner 740 may comprise a polymeric material that is shaped using, for example, a molding operation (e.g., injection molding, blow molding, compression molding, drawing, etc.). In various embodiments, a combination of a metallic material, a polymeric material, and/or any other suitable material may also be utilized to form liner 740. For example, liner 740 may comprise a metallic material (e.g., niobium, steel, etc.) having one or more surfaces coated with a polymeric layer (e.g., PTFE) and/or other suitable material. In other embodiments, liner 740 may be formed on superabrasive element 10 as a coating by spraying, dipping, polymerization, electroplating, chemical vapor deposition, physical vapor deposition, and/or any suitable coating technique, without limitation. Such a coating may be formed on superabrasive element 10 so as to have rounded edge portions formed adjacent more angular portions (e.g., chamfer 28) of superabrasive element 10.

Liner 740 may comprise any suitable size, shape, and geometry configured to surround at least a portion of superabrasive element 10. In at least one embodiment, portions of liner 740 may have a substantially cylindrical and/or annular outer periphery surrounding central axis 29, as illustrated in FIG. 13. Rear wall 742 and side wall 744 may define a cavity 748 within liner 740. Cavity 748 may be shaped to surround at least a portion of superabrasive element 10. An opening 746 may be defined in a portion of liner 740 opposite rear wall 742 such that cavity 748 extends between opening 746 and rear wall 742. According to at least one embodiment, liner 740 may be sized to fit within an encapsulating region of a protective leaching cup (e.g., encapsulating region 39 of protective leaching cup 30 in FIG. 6).

As shown in FIG. 13, superabrasive element 10 may be positioned within liner 740 such that at least a portion of an outer periphery of superabrasive element 10 is surrounded by protective liner 740. For example, superabrasive element 10 may be positioned within liner 740 so that at least a portion of rear surface 18 of superabrasive element 10 is adjacent rear wall 742 of liner 740 and/or so that at least a portion of side surface 15 of superabrasive element 10 is adjacent side wall 744 of liner 740. For example, side wall 744 of liner 740 may be disposed adjacent substrate side surface 16. In at least one embodiment, side wall 744 of liner 740 may extend adjacent substrate side surface 16 of superabrasive element 10. As shown in FIG. 13, side wall 744 of liner 740 may extend along a portion of substrate side surface 16 of superabrasive element 10 and/or rear wall 742 of liner 740 may extend along a portion of rear surface 18 of superabrasive element 10. For example, side wall 744 may extend to a region adjacent to or near chamfer 28 and/or rear wall 742 may extend to a region adjacent to or near chamfer 28 of superabrasive element 10. In some embodiments, side wall 744 of liner 740 may abut chamfer 28 and/or rear wall 742 of liner 740 may abut chamfer 28 of superabrasive element 10.

In some embodiments, superabrasive element 10 may contact side wall 744 of liner 740. For example, superabrasive element 10 may be tightly surrounded by liner 740 so as to secure liner 740 to superabrasive element 10. For example, liner 740 may be secured around superabrasive element 10 by press-fitting. According to some embodiments, liner 740 may be bonded or otherwise adhered to at least a portion of side surface 15 and/or at least a portion of rear surface 18 of superabrasive element 10. In additional embodiments, superabrasive element 10 may be less tightly (e.g., removably) surrounded by liner 740, thereby facilitating insertion and/or removal of superabrasive element 10 from liner 740.

In some embodiments, a gap 750 may be defined between rounded edge portion 749 of liner 740 and chamfer 28 of superabrasive element 10. For example, when superabrasive element 10 is disposed within liner 740 such that element side surface 15 and rear surface 18 of superabrasive element 10 are respectively positioned adjacent side wall 744 and rear wall 742 of liner 740, chamfer 28 of superabrasive element 10 may be spaced away from an inner surface of rounded edge portion 749 so as to define gap 750. According to some embodiments, opening 757, which is defined in liner 740 so as to be open to cavity 748, may facilitate loading of superabrasive element 10 into liner 740 and/or may prevent excess gases and/or fluids from becoming trapped between liner 740 and superabrasive element 10. According to some embodiments, liner 740 may circumferentially surround and/or abut a peripheral portion of superabrasive element 10 with respect to central axis 29. In at least one embodiment, liner 740 may comprise one or more separate segments spaced circumferentially around at least a portion of superabrasive element 10.

Figure 14:
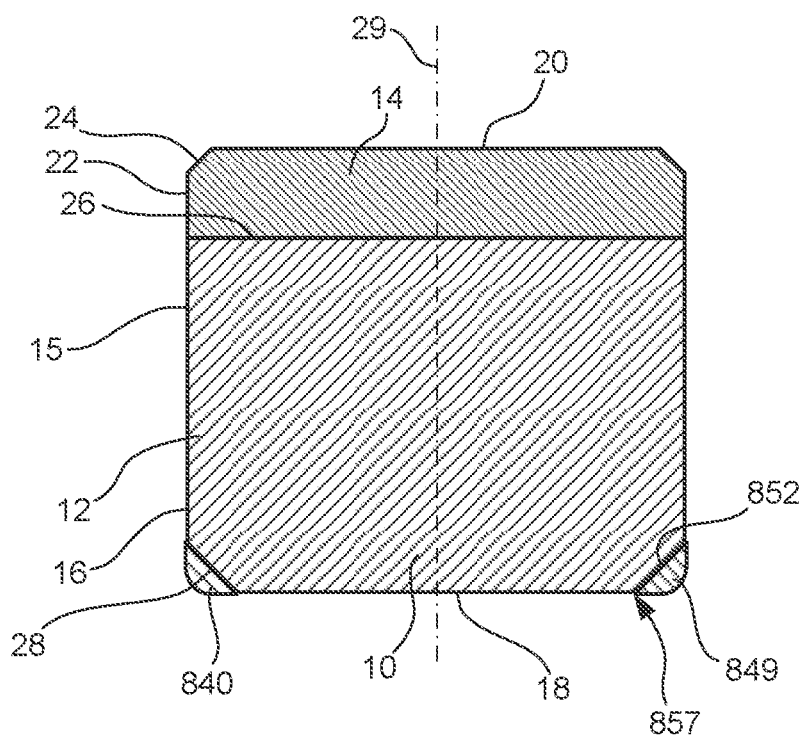
FIG. 14 is a cross-sectional side view of an exemplary superabrasive element positioned within an exemplary liner according to at least one embodiment.

FIG. 14 shows a liner 840 surrounding and/or abutting a portion of superabrasive element 10, according to various embodiments. Liner 840 may comprise a surface, such as sloped surface 852, configured to surround and/or abut at least a portion of superabrasive element 10. Additionally, liner 840 may comprise a rounded edge portion 849 formed adjacent or near sloped surface 852. Rounded edge portion 849 may comprise any suitable surface shape, such as, for example, an arcuate surface (e.g., a radius, an ovoid shape, or any other rounded shape), multiple radii, a honed edge, a combination arcuate and flat surface, or any combination of the foregoing. Sloped surface 852 and rounded edge portion 849 may each be formed to any suitable thickness, without limitation. According to some embodiments, an opening 857 may be defined in liner 840.

Liner 840 may be formed of any suitable material. For example, liner 840 may comprise a rigid or substantially rigid material. In some embodiments, liner 840 may comprise one or more metallic materials. For example, liner 840 may be formed of one or more refractory metal materials, such as niobium, tantalum, molybdenum, tungsten, rhenium, chromium, vanadium, hafnium, zirconium, and/or any other suitable metallic material or alloy thereof. In additional embodiments, liner 840 may comprise various other suitable metallic materials and/or alloys thereof, such as, for example, precious metals, platinum group metals (e.g., gold and/or platinum), iron, tin, copper, silver, bronze, aluminum, steel and/or steel alloys, or any alloys of one or more of the foregoing. In additional embodiments, liner 840 may comprise one or more polymeric materials. For example, liner 840 may comprise polytetrafluoroethylene (PTFE) and/or any other suitable polymer or resin, without limitation. Liner 840 may also comprise any other suitable material or combination of materials, including, for example, ceramic, glass, a carbon material, a metallic material, a carbon allotrope material, a composite material, an oxide material, a carbide material, and/or any combination of the foregoing.

Liner 840 may be formed using any suitable technique. For example, liner 840 may comprise a metallic material that is shaped through a molding, drawing, machining, milling, grinding, and/or any other suitable metalworking or forming technique. According to some embodiments, a generally disk-shaped blank (e.g., a niobium blank) may be subjected to a drawing operation. During such a drawing operation, a punch may be utilized to force the disk-shaped blank into a corresponding forming die cavity. In at least one embodiment, liner 840 may comprise a polymeric material that is shaped using, for example, a molding operation (e.g., injection molding, blow molding, compression molding, drawing, etc.). In various embodiments, a combination of a metallic material, a polymeric material, and/or any other suitable material may also be utilized to form liner 840. For example, liner 840 may comprise a metallic material (e.g., niobium, steel, etc.) having one or more surfaces coated with a polymeric layer (e.g., PTFE) and/or other suitable material. In other embodiments, liner 840 may be formed on superabrasive element 10 as a coating by spraying, dipping, polymerization, electroplating, chemical vapor deposition, physical vapor deposition, and/or any suitable coating technique, without limitation. Such a coating may be formed on superabrasive element 10 so as to have rounded edge portions formed adjacent more angular portions (e.g., chamfer 28) of superabrasive element 10.

Liner 840 may comprise any suitable size, shape, and geometry configured to surround and/or abut at least a portion of superabrasive element 10. In at least one embodiment, portions of liner 840 may have a substantially annular outer periphery surrounding central axis 29, as illustrated in FIG. 14. According to at least one embodiment, liner 840 may be sized to fit within an encapsulating region of a protective leaching cup (e.g., encapsulating region 39 of protective leaching cup 30 in FIG. 6).

As shown in FIG. 14, at least a portion of superabrasive element 10 may be positioned within and/or abutting liner 840 such that at least a portion of an outer periphery of superabrasive element 10 is surrounded by protective liner 840. For example, superabrasive element 10 may be positioned within liner 840 so that at least a portion of superabrasive element 10 (e.g., substrate chamfer 28) is adjacent sloped surface 852 of liner 840. According to certain embodiments, protective liner 840 may be shaped to abut various portions of a superabrasive element, such as an angular or rounded intersection or edge defined by a side surface, a rear surface, and/or a chamfered surface (e.g., substrate edge 149 of superabrasive element 110 illustrated in FIGS. 7 and 8).

In some embodiments, at least a portion of superabrasive element 10 may be tightly surrounded by liner 840 so as to secure liner 840 to superabrasive element 10. According to some embodiments, liner 840 may be bonded or otherwise adhered to at least a portion of side surface 15, rear surface 18, and/or substrate chamfer 28 of superabrasive element 10. In additional embodiments, superabrasive element 10 may be less tightly (e.g., removably) surrounded and/or abutted by liner 840, thereby facilitating insertion and/or removal of superabrasive element 10 from liner 840. When superabrasive element 10 is disposed within and/or abutting liner 840, substrate chamfer 28 of superabrasive element 10 may be located adjacent to and/or in contact with sloped surface 852 of liner 840. According to at least one embodiment, sloped surface 852 may substantially conform to a shape of substrate chamfer 28. According to some embodiments, liner 840 may circumferentially surround and/or abut a peripheral portion of superabrasive element 10 with respect to central axis 29. In at least one embodiment, liner 840 may comprise one or more separate segments spaced circumferentially around at least a portion of superabrasive element 10.

Figure 15:
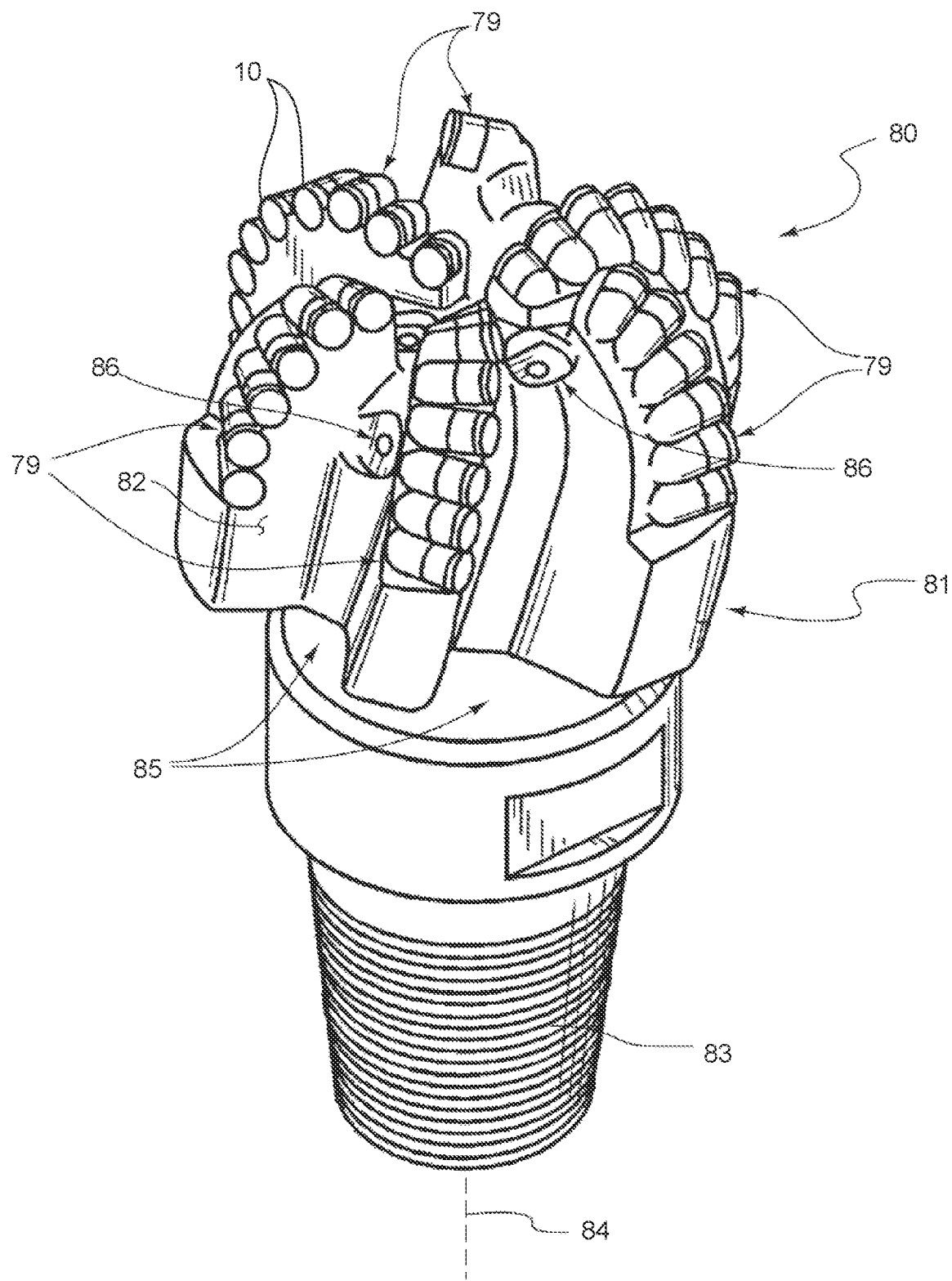
FIG. 15 is a perspective view of an exemplary drill bit according to at least one embodiment.

FIG. 15 is a perspective view of an exemplary drill bit 80 according to at least one embodiment. Drill bit 80 may represent any type or form of earth-boring or drilling tool, including, for example, a rotary drill bit. As illustrated in FIG. 15, drill bit 80 may comprise a bit body 81 having a longitudinal axis 84. Bit body 81 may define a leading end structure for drilling into a subterranean formation by rotating bit body 81 about longitudinal axis 84 and applying weight to bit body 81. Bit body 81 may include radially and longitudinally extending blades 79 with leading faces 82 and a threaded pin connection 83 for connecting bit body 81 to a drill string.

At least one superabrasive element 10 and/or at least one superabrasive element 310 may be coupled to bit body 81. For example, as shown in FIG. 15, a plurality of superabrasive elements 10 may be coupled to blades 79. Drill bit 80 may utilize any of the disclosed superabrasive elements 10 as cutting elements. Circumferentially adjacent blades 79 may define so-called junk slots 85 therebetween. Junk slots 85 may be configured to channel debris, such as rock or formation cuttings, away from superabrasive elements 10 during drilling. Drill bit 80 may also include a plurality of nozzle cavities 86 for communicating drilling fluid from the interior of drill bit 80 to superabrasive elements 10.

FIG. 15 depicts an example of a drill bit 80 that employs at least one cutting element 10. Drill bit 80 may additionally represent any number of earth-boring tools or drilling tools, including, for example, core bits, roller-cone bits, fixed-cutter bits, eccentric bits, bicenter bits, reamers, reamer wings, and/or any other downhole tools comprising superabrasive cutting elements and/or discs, without limitation. Superabrasive elements 10 disclosed herein may also be utilized in applications other than cutting technology. For example, embodiments of superabrasive elements 10 disclosed herein may also form all or part of heat sinks, wire dies, bearing elements, cutting elements, cutting inserts (e.g., on a roller cone type drill bit), machining inserts, or any other article of manufacture, as known in the art. According to some examples, superabrasive elements 10, as disclosed herein, may be employed in medical device applications, including, without limitation, hip joints, back joints, or any other suitable medical joints. Thus, superabrasive elements 10, as disclosed herein, may be employed in any suitable article of manufacture. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

In additional embodiments, a rotor and a stator, such as a rotor and a stator used in a thrust bearing apparatus, may each include at least one superabrasive element according to the embodiments disclosed herein. By way of example, U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements 10 as disclosed herein.

Figure 16:
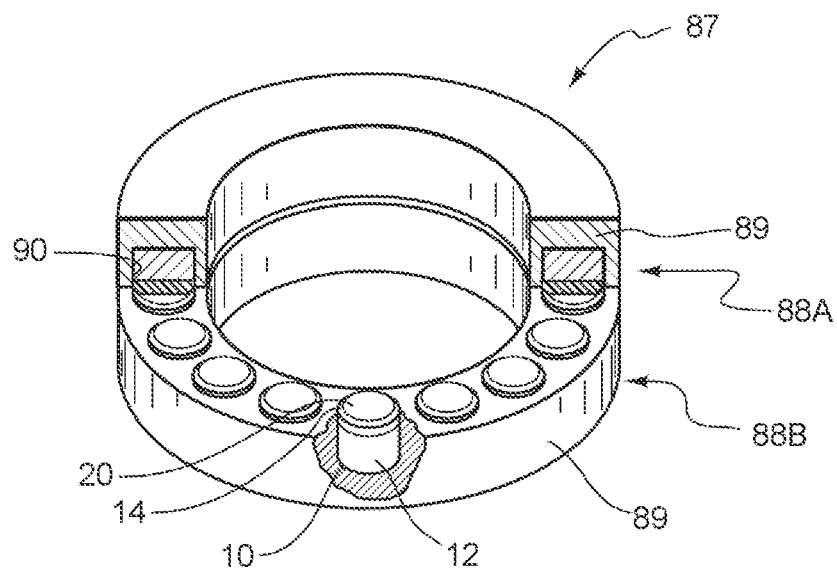
FIG. 16 is a partial cut-away perspective view of an exemplary thrust bearing apparatus according to at least one embodiment.

FIG. 16 is partial cross-sectional perspective view of an exemplary thrust-bearing apparatus 87 according to at least one embodiment. Thrust-bearing apparatus 87 may utilize any of the disclosed superabrasive elements 10 and/or superabrasive elements 310 as bearing elements. Thrust-bearing apparatus 87 may also include bearing assemblies 88A and 88B. Each of bearing assembly 88A and 88B may include a support ring 89 fabricated from a material, such as steel, stainless steel, or any other suitable material, without limitation.

Each support ring 89 may include a plurality of recesses 90 configured to receive corresponding superabrasive elements 10. Each superabrasive element 10 may be mounted to a corresponding support ring 89 within a corresponding recess 90 by brazing, welding, press-fitting, using fasteners, or any another suitable mounting technique, without limitation. In at least one embodiment, one or more of superabrasive elements 10 may be configured according to any of the superabrasive element embodiments described herein. For example, each superabrasive element 10 may include a substrate 12 and a superabrasive table 14 comprising a PCD material. Each superabrasive table 14 may form a superabrasive face 20 that is utilized as a bearing surface.

Superabrasive faces 20 of bearing assembly 88A may bear against opposing superabrasive faces 20 of bearing assembly 88B in thrust-bearing apparatus 87, as illustrated in FIG. 16. For example, bearing assembly 88A of thrust-bearing apparatus 87 may be termed a "rotor." The rotor may be operably coupled to a rotational shaft. Bearing assembly 88B of thrust-bearing apparatus 87 may be held substantially stationary relative to the bearing assembly 88A and may be termed a "stator."

Figure 17:
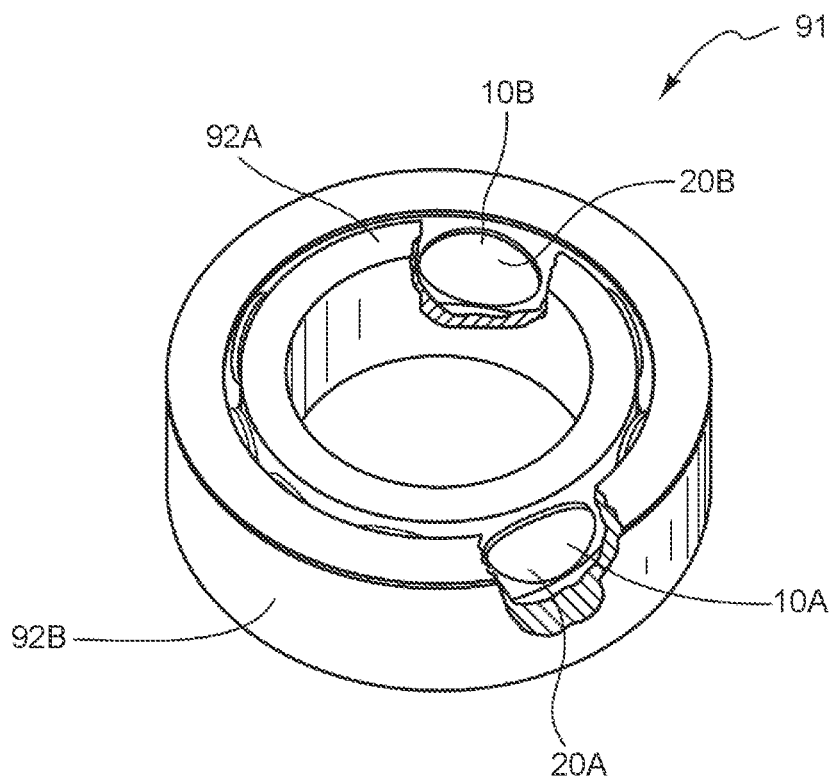
FIG. 17 is a partial cut-away perspective view of an exemplary radial bearing apparatus according to at least one embodiment.

FIG. 17 is a perspective view of a radial bearing apparatus 91 according to another embodiment. Radial bearing apparatus 91 may utilize any of the disclosed superabrasive element embodiments as bearing elements 10A and 10B. Radial bearing apparatus 91 may include an inner race 92A positioned generally within an outer race 92B. Inner race 92A may include a plurality of bearing elements 10A affixed thereto, and outer race 92B may include a plurality of corresponding bearing elements 10B affixed thereto. One or more of bearing elements 10A and 10B may be configured in accordance with any of the superabrasive element embodiments disclosed herein.

Inner race 92A may be positioned generally within outer race 92B. Thus, inner race 92A and outer race 92B may be configured such that bearing surfaces 20A defined by bearing elements 10A and bearing surfaces 20B defined by bearing elements 10B may at least partially contact one another and move relative to one another as inner race 92A and outer race 92B rotate relative to each other. According to various embodiments, thrust-bearing apparatus 87 and/or radial bearing apparatus 91 may be incorporated into a subterranean drilling system.

Figure 18:
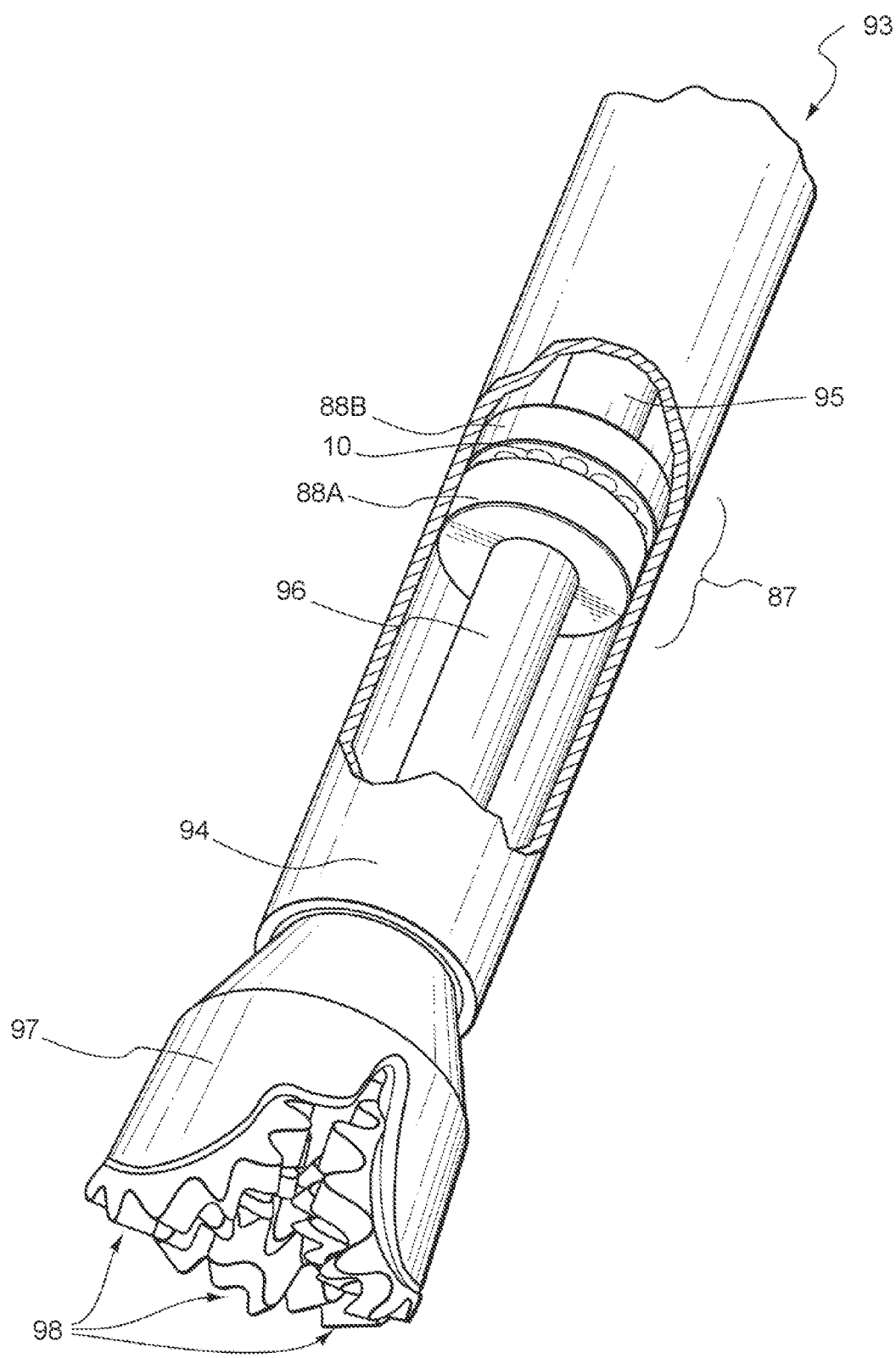
FIG. 18 is a partial cut-away perspective view of an exemplary subterranean drilling system according to at least one embodiment.

FIG. 18 is a partial cross-sectional perspective view of an exemplary subterranean drilling system 93 that includes a thrust-bearing apparatus 87, as shown in FIG. 16, according to at least one embodiment. The subterranean drilling system 93 may include a housing 94 enclosing a downhole drilling motor 95 (i.e., a motor, turbine, or any other suitable device capable of rotating an output shaft, without limitation) that is operably connected to an output shaft 96.

The thrust-bearing apparatus 87 shown in FIG. 16 may be operably coupled to downhole drilling motor 95. A rotary drill bit 97, such as a rotary drill bit configured to engage a subterranean formation and drill a borehole, may be connected to output shaft 96. As illustrated in FIG. 18, rotary drill bit 97 may be a roller cone bit comprising a plurality of roller cones 98. According to additional embodiments, rotary drill bit 97 may comprise any suitable type of rotary drill bit, such as, for example, a so-called fixed-cutter drill bit. As a borehole is drilled using rotary drill bit 97, pipe sections may be connected to subterranean drilling system 93 to form a drill string capable of progressively drilling the borehole to a greater depth within a subterranean formation.

A thrust-bearing assembly 88A in thrust-bearing apparatus 87 may be configured as a rotor that is attached to output shaft 96 and a thrust-bearing assembly 88B in thrust-bearing apparatus 87 may be configured as a stator. During a drilling operation using subterranean drilling system 93, the rotor may rotate in conjunction with output shaft 96 and the stator may remain substantially stationary relative to the rotor.

According to various embodiments, drilling fluid may be circulated through downhole drilling motor 95 to generate torque and effect rotation of output shaft 96 and rotary drill bit 97 attached thereto so that a borehole may be drilled. A portion of the drilling fluid may also be used to lubricate opposing bearing surfaces of superabrasive elements 10 on thrust-bearing assemblies 88A and 88B.

Figure 19:
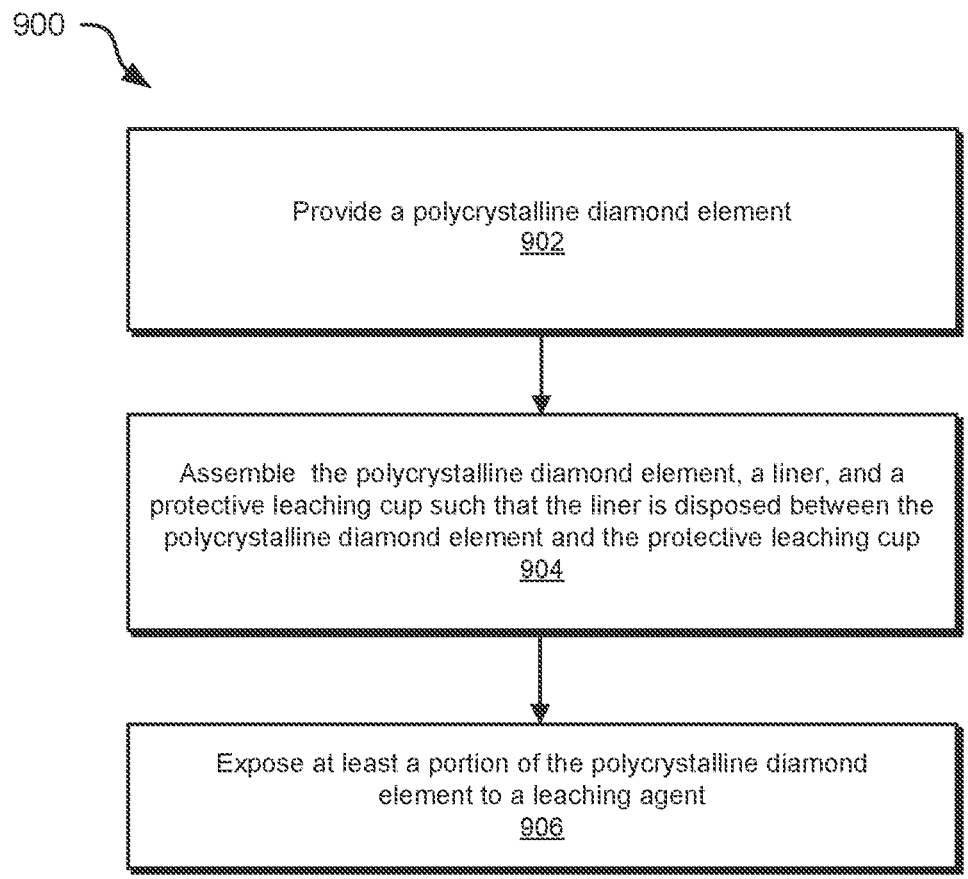
FIG. 19 is a flow diagram of an exemplary method of processing a polycrystalline diamond element according to at least one embodiment.

FIG. 19 illustrates an exemplary method 400 for processing a polycrystalline diamond element according to at least one embodiment. As shown in FIG. 19, a polycrystalline diamond element may be provided (process 902). In some embodiments, a superabrasive element 10 may comprise a superabrasive table 14 affixed to or formed upon a substrate 12. The polycrystalline diamond element may comprise a rear surface opposite the cutting face and a side surface extending between the cutting face and the rear surface in a direction substantially parallel to a central axis of the polycrystalline diamond element. For example, as illustrated in FIGS. 1 and 2, superabrasive element 10 may comprise a superabrasive face 20, a rear surface 18, and an element side surface 15.

The polycrystalline diamond element, a liner, and a protective leaching cup may be assembled such that the liner is disposed between the polycrystalline diamond element and the protective leaching cup. (process 904). For example, superabrasive element 10 may be positioned within a liner 40 as illustrated in FIG. 5. Superabrasive element 10 may be positioned within liner 40 such that at least a portion of an outer periphery of superabrasive element 10 is surrounded by protective liner 40. For example, superabrasive element 10 may be positioned within liner 40 so that at least a portion of rear surface 18 of superabrasive element 10 is adjacent rear wall 42 of liner 40 and/or so that at least a portion of side surface 15, such as substrate side surface 16, is adjacent side wall 44 of liner 40. Superabrasive element 10 and liner 40 may be positioned within protective leaching cup 30 as illustrated in FIG. 6. The protective leaching cup may include a seal region contacting a portion of a side surface of the polycrystalline diamond element. For example, protective leaching cup 30 may comprise a seal region 38 that contacts an element side surface 18 of superabrasive 10, as illustrated in FIGS. 4 and 6.

At least a portion of the polycrystalline diamond element may then be exposed to a leaching agent (process 906). For example, as shown in FIG. 5, superabrasive element 10 may be positioned within protective leaching cup 30 so that portions of superabrasive table 14, such as superabrasive face 20 and/or superabrasive chamfer 24, are not covered by protective leaching cup 30. Superabrasive element 10 and protective leaching cup 30 may then be exposed to a leaching agent in any suitable manner. For example, superabrasive element 10 and protective leaching cup 30 may be at least partially submerged in a leaching agent that is suitable for leaching various materials from the exposed portions of superabrasive table 14. In at least one embodiment, a corrosive leaching agent may be used to remove a metal-solvent catalyst from interstitial spaces between diamond grains in superabrasive table 14. According to various embodiments, the leaching agent may comprise various solvents, acids, and/or other suitable reagents, including, without limitation, water, peroxide, nitric acid, hydrofluoric acid, and/or hydrochloric acid. Superabrasive element 10 may be exposed to the leaching agent for any suitable period of time. For example, superabrasive element 10 may be exposed to the leaching agent until various interstitial materials, such as, for example, a metal-solvent catalyst, are removed from superabrasive table 14 to a desired depth or degree.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A leaching assembly for processing a polycrystalline diamond element, comprising:
   a protective leaching cup comprising a seal region having a reduced diameter, the seal region configured to contact at least a portion of a side surface of a polycrystalline diamond element when the polycrystalline diamond element is inserted into the protective leaching cup; and
   a liner positioned within the protective leaching cup in a position between the protective leaching cup and at least a portion of the polycrystalline diamond element that is to be received in the protective leaching cup and the liner, the liner comprising:
      an opening for receiving the at least a portion of the polycrystalline diamond element;
      a rear wall opposite the opening;
      a side wall extending between the opening and the rear wall; and
      a tapered interface extending between the side wall and the rear wall.

2. The leaching assembly of claim 1, wherein the tapered interface comprises an arcuate cross-sectional shape that gradually decreases in diameter as the tapered interface extends from the side wall to the rear wall of the liner.

3. The leaching assembly of claim 1, wherein the tapered interface defines a rounded edge portion of a rear portion of the liner.

4. The leaching assembly of claim 1, wherein the tapered interface exhibits an edge portion that is angled relative to the rear wall and side wall of the liner.

5. The leaching assembly of claim 1, wherein the tapered interface is configured to partially conform to a chamfered rear surface of a substrate of the polycrystalline diamond element.

6. The leaching assembly of claim 5, wherein the tapered interface defines a seal with the substrate of the polycrystalline diamond element to at least partially isolate the chamfered rear surface of the substrate of the polycrystalline diamond element from a leaching agent supplied in a leaching process.

7. The leaching assembly of claim 5, wherein the tapered interface is configured to define a gap between the liner and the chamfered rear surface of the substrate of the polycrystalline diamond element.

8. The leaching assembly of claim 1, wherein the tapered interface is configured to define a gap between the liner and a rearward portion of the polycrystalline diamond element.

9. A leaching assembly for processing a polycrystalline diamond element, comprising:
   a protective leaching cup; and
   a liner positioned within the protective leaching cup in a position between the protective leaching cup and at least a portion of a polycrystalline diamond element that is to be received in the protective leaching cup and the liner, the liner comprising:
      an opening for receiving the at least a portion of the polycrystalline diamond element;
      a rear wall opposite the opening;
      a side wall extending between the opening and the rear wall; and
      a tapered interface extending between the side wall and the rear wall, wherein the liner comprises another opening at the rear wall of the liner.

10. The leaching assembly of claim 9, wherein the protective leaching cup further comprises a seal region having a reduced diameter, the seal region configured to contact at least a portion of a side surface of the polycrystalline diamond element when the polycrystalline diamond element is inserted into the protective leaching cup.

11. A leaching assembly for processing a superabrasive element, the leaching assembly comprising:
    a protective leaching cup configured to surround at least a portion of a superabrasive element; and
    a liner in the protective leaching cup and configured to be positioned between the superabrasive element and the protective leaching cup, the liner comprising:
       an opening for receiving the at least a portion of the superabrasive element;
       a rear wall positioned opposite the opening;
       a side wall extending between the opening and the rear wall; and
       an interface between the side wall and the rear wall, the interface configured to accommodate a chamfered rear surface of the superabrasive element, wherein the interface is configured to define a gap between the liner and the chamfered rear surface of the superabrasive element.

12. The leaching assembly of claim 11, wherein the interface comprises a cross-sectional shape that gradually decreases in size as the interface extends from the side wall to the rear wall of the liner.

13. The leaching assembly of claim 11, wherein the protective leaching cup further comprises a seal region having a reduced diameter, the seal region configured to contact the superabrasive element when the superabrasive element is inserted into the protective leaching cup.

14. The leaching assembly of claim 11, wherein the interface exhibits a rounded shape.

15. The leaching assembly of claim 11, wherein the interface defines a seal with the superabrasive element to at least partially isolate the chamfered rear surface of the superabrasive element from a leaching agent supplied in a leaching process.

16. A method of processing a polycrystalline diamond element, the method comprising:
    inserting a portion of a polycrystalline diamond element in a protective leaching cup having a liner that is disposed between the polycrystalline diamond element and the protective leaching cup;
    positioning the polycrystalline diamond element in the liner such that a tapered rearward edge of the liner at least partially conforms to a chamfered rear surface of the polycrystalline diamond element, the tapered rearward edge of the liner exhibiting an arcuate cross section; and
    exposing at least a portion of the polycrystalline diamond element to a leaching agent.

17. A method of processing a polycrystalline diamond element, the method comprising:
    inserting a portion of a polycrystalline diamond element in a protective leaching cup having a liner that is disposed between the polycrystalline diamond element and the protective leaching cup, the liner at least partially conforming to a chamfered rear surface of the polycrystalline diamond element;
    exposing at least a portion of the polycrystalline diamond element to a leaching agent; and defining a gap between the liner and the chamfered rear surface of the polycrystalline diamond element.

18. The method of claim 17, further comprising defining the gap to comprise an annular gap between the liner and a chamfer of a substrate of the polycrystalline diamond element.

19. The method of claim 17, further comprising positioning the polycrystalline diamond element in the liner such that a tapered rearward edge of the liner conforms to the chamfered rear surface of the polycrystalline diamond element.

20. The method of claim 19, further comprising selecting the tapered rearward edge of the liner to exhibit an arcuate cross section.

\* \* \* \* \*